United States Patent
Li et al.

(10) Patent No.: US 12,069,246 B2
(45) Date of Patent: *Aug. 20, 2024

(54) DECODER SIDE INTRA MODE DERIVATION FOR MOST PROBABLE MODE LIST CONSTRUCTION IN VIDEO CODING

(71) Applicant: QUALCOMM Incorporated, San Diego, CA (US)

(72) Inventors: Jingya Li, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,602

(22) Filed: Dec. 15, 2022

(65) Prior Publication Data

US 2023/0114696 A1 Apr. 13, 2023

Related U.S. Application Data

(63) Continuation of application No. 17/502,875, filed on Oct. 15, 2021.

(Continued)

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11); *H04N 19/46* (2014.11)

(58) Field of Classification Search
CPC .. H04N 19/105; H04N 19/132; H04N 19/159; H04N 19/176; H04N 19/46;
(Continued)

(56) References Cited

U.S. PATENT DOCUMENTS

2014/0376626 A1* 12/2014 Lee ............. H04N 19/157
375/240.12
2017/0374369 A1* 12/2017 Chuang ............. H04N 19/593
(Continued)

FOREIGN PATENT DOCUMENTS

WO 2017192995 A1 11/2017

OTHER PUBLICATIONS

Abdoli (Ateme) M., et al., "Non-CE3: Decoder-Side Intra Mode Derivation (DIMD) with Prediction Fusion Using Planar", 15. JVET Meeting, Jul. 3-Jul. 12, 2019, Gothenburg, (The Joint Video Exploration Team of ISO/IEC JTC1/ SC29/WG11 and ITU-TSG. 16), No. JVET-O0449-V2, m48570, Jul. 4, 2019, XP030219611, XP030219610, abstract, figures 1-3, paragraphs [0001], [0002], [8.4.2], pp. 1-9.

(Continued)

*Primary Examiner* — Francis Geroleo
(74) *Attorney, Agent, or Firm* — Shumaker & Sieffert, PA

(57) ABSTRACT

An method of decoding video data includes deriving, for a current block of video data and using decoder side intra mode derivation (DIMD), a list of intra modes using reconstructed samples of neighboring blocks; constructing, for the current block, a most probable mode (MPM) list, wherein constructing the MPM list comprises inserting, into the MPM list, at least one intra mode from the derived list of intra modes; and predicting, using a candidate selected from the constructed MPM list, the current block.

20 Claims, 19 Drawing Sheets

Related U.S. Application Data

(60) Provisional application No. 63/129,004, filed on Dec. 22, 2020.

(51) Int. Cl.
*H04N 19/159* (2014.01)
*H04N 19/176* (2014.01)
*H04N 19/46* (2014.01)

(58) Field of Classification Search
CPC .... H04N 19/186; H04N 19/11; H04N 19/147; H04N 19/70; H04N 19/593
See application file for complete search history.

(56) References Cited

U.S. PATENT DOCUMENTS

| | | | |
|---|---|---|---|
| 2019/0215521 A1* | 7/2019 | Chuang | H04N 19/44 |
| 2021/0243452 A1* | 8/2021 | Zhao | H04N 19/70 |
| 2022/0201281 A1 | 6/2022 | Li et al. | |

OTHER PUBLICATIONS

Abdoli M., et al., "Non-CE3: Decoder-Side Intra Mode Derivation with Prediction Fusion", JVET-N0342, Joint Video Experts Team (JVET) of ITU-T SG 16 WP 3 and ISO/IEC JTC 1/SC 29/WG 11, 14th Meeting: Geneva, CH, Mar. 19-29, 2019, pp. 1-6.
Bross B., et al., "Versatile Video Coding Editorial Refinements on Draft 10", JVET-T2001-v2, 20. JVET Meeting, Oct. 7-Oct. 16, 2020, Teleconference, (The Joint Video Experts Team of ISO/IEC JTC1/SC29/WG11 and ITU-T SG 16), Nov. 24, 2020 (Nov. 24, 2020), pp. 1-515.
Chang Y-J., et al., "Compression Efficiency Methods Beyond VVC", 21. JVET Meeting, Jan. 6-Jan. 15, 2021, by teleconference, (The Joint Video Exploration Team of ISO/IEC JTC1/SC29/WG11 and ITU-T SG.16), No. JVET-U0100, Dec. 31, 2020, pp. 1-13.
Chen Y., et al., "Description of SDR, HDR and 360° Video Coding Technology Proposal by Qualcomm and Technicolor—Low and High Complexity Versions", JVET-J0021, Joint Video Exploration Team (JVET) of ITU-T SG 16 WP 3 and ISO/IEC JTC 1/SC 29/WG 11, 10th Meeting: San Diego, US, Apr. 10-20, 2018, pp. 1-42.
Henry F., et al., "Residual Coefficient Sign Prediction", 4th JVET Meeting, Oct. 15-Oct. 21, 2016, Chengdu, (The Joint Video Exploration Team of ISO/IEC JTC1/SC29/WG11 and ITU-T SG.16 WG 3), URL: http://phenix.int-evry.fr/jvet/, No. JVET-D0031, Oct. 20, 2016 (Oct. 20, 2016), JVET-D0031-v2, JVET-D0031-v4, XP030150258, pp. 1-6.
International Search Report and Written Opinion—PCT/US2021/072379—ISA/EPO—Mar. 15, 2022.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
Mora E., et al., "CE3: Decoder-Side Intra Mode Derivation (tests 3.1.1, 3.1.2, 3.1.3 and 3.1.4)", JVET-M0094-v2, Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-7.
Mora E., et al., "CE3-Related: Decoder-Side Intra Mode Derivation", JVET-L0164-v2, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-8.
Nasrallah A., et al., "Decoder-Side Intra Mode Derivation with Texture Analysis in VVC Test Model", 2019 IEEE International Conference on Image Processing (ICIP), IEEE, Sep. 22, 2019 (Sep. 22, 2019), pp. 3153-3157.
Ray B., et al., "Unified PDPC for Angular Intra Modes", JVET-Q391-v3, Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-7.
Schwarz H., et al., "Additional Support of Dependent Quantization with 8 States", JVET-Q0243-v2, Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-12.
Seregin V., et al., "CE4-3.1a and CE4-3.1b: Unidirectional Local Illumination Compensation with Affine Prediction", Joint Video Experts Team (JVET) of ITU-T SG 16 WP 3 and ISO/IEC JTC 1/SC 29/WG 11, JVET-O0066-v1, 15th Meeting, Gothenburg, SE, Jul. 3-12, 2019, pp. 1-5.
Seregin V., et al., "Block Shape Dependent Intra Mode Coding", 4th Jvet Meeting, Chengdu, (The Joint Video Exploration Team of ISO/IEC JTC1/SC29/WG11 and ITU-T SG.16 WP 3), JVET-D0114r1, URL: http://phenix.int-evry.fr/jvet/, CN, Oct. 15-21, 2016, 3 pages.
Winken (Fraunhofer) M., et al., "CE10: Multi-Hypothesis Inter Prediction (Test 10.1.2)", JVET-M0425-v2, Joint Video Experts Team (JVET) of ITU-T SG 16 WP 3 and ISO/IEC JTC 1/SC 29/WG 11, 13th Meeting: Marrakech, MA, Jan. 9-18, 2019, Marrakech, (The Joint Video Exploration Team of ISO/IEC JTC1/SC29/WG11 and ITU-TSG.16), No. JVET-M0425 Jan. 2019 (Jan. 7, 2019), pp. 1-14.
Xiu (Interdigital) X., et al., "Decoder-Side Intra Mode Derivation", 115. MPEG Meeting, May 30-Jun. 3, 2016, Geneva, (Motion Picture Expert Group or ISO/IEC JTC1/SC29/WG11), No. m38449, May 26, 2016 (May 26, 2016), XP030269419, pp. 1-5.
Zhang K., et al., "Enhanced Cross-Component Linear Model Intra-Prediction", JVET-D0110, Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-D0110-v3, pp. 1-6.

* cited by examiner

DECODER SIDE INTRA MODE DERIVATION FOR MOST PROBABLE MODE LIST CONSTRUCTION IN VIDEO CODING

This application is a continuation of U.S. patent application Ser. No. 17/502,875, filed 15 Oct. 2021, which claims the benefit of U.S. Provisional Patent Application No. 63/129,004, filed 22 Dec. 2020, the entire content of each application is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coding video data using derived intra mode deviation (DIMD). To perform intra mode coding without DIMD, a video coder (e.g., a video encoder and/or a video decoder) may construct a list of intra mode candidates (e.g., a most probable mode (MPM) list) and signal which candidate from the list is used as the intra mode for the current block. To perform intra mode coding with DIMD, a video decoder may implicitly derive intra modes for a current block based on reconstructed samples of neighboring blocks and predict the current block based on a blending of the derived intra modes. The video encoder may determine whether to predict the current block using DIMD or not and signal a syntax element that indicates whether the current block is predicted using DIMD or predicted using the list (e.g., not predicted using DIMD). However, implementations of DIMD may present various disadvantages. For instance, implementations of DIMD prediction may involve a video encoder determining whether to perform intra prediction using a blended prediction from a plurality of DIMD derived modes or from a single mode. Such implementations may sacrifice robustness wherein the optimal prediction mode is one of the DIMD derived modes, but optimal prediction might be from a single prediction only (e.g., as opposed to blended prediction from the DIMD derived modes).

In accordance with one or more techniques of this disclosure, a video coder (e.g., a video encoder and/or a video decoder) may include one or more of the DIMD derived modes as candidate intra modes in a most probable mode (MPM) list. For instance, the video coder may perform DIMD mode derivation to derive one or more DIMD modes and include the one or more derived DIMD modes in the list of intra mode candidates. The video coder may signal which candidate from the list is used as the intra mode for the current block. For instance, where a particular DIMD mode one of the DIMD modes included in the list is the optimal prediction mode, the video encoder may signal that the particular DIMD mode is to be used as the intra mode for the current block. Use of more optimal modes may reduce a number of bits used to represent video data. As such, in this way, the techniques of this disclosure may improve coding efficiency.

In one example, a method of decoding video data includes deriving, for a current block of video data and using DIMD, a list of intra modes using reconstructed samples of neighboring blocks; constructing, for the current block, a most probable mode (MPM) list, wherein constructing the MPM list comprises inserting, into the MPM list, at least one intra mode from the derived list of intra modes; and predicting, using a candidate selected from the constructed MPM list, the current block.

In another example, a method of encoding includes deriving, for a current block of video data and using DIMD, a list of intra modes using reconstructed samples of neighboring blocks; constructing, for the current block, a MPM list, wherein constructing the MPM list comprises inserting, into the MPM list, at least one intra mode from the derived list of intra modes; selecting, for the current block and from the MPM list, a candidate intra mode; and encoding, for the current block, one or more syntax element that specify the candidate intra mode.

In another example, a device for decoding video data includes a memory configured to store video data; and one or more processors implemented in circuitry and configured to: derive, for a current block of video data and using DIMD, a list of intra modes using reconstructed samples of neighboring blocks; construct, for the current block, a MPM list, wherein constructing the MPM list comprises inserting, into the MPM list, at least one intra mode from the derived list of intra modes; and predict, using a candidate selected from the constructed MPM list, the current block.

In another example, a device for encoding video data includes a memory configured to store video data; and one or more processors implemented in circuitry and configured to: derive, for a current block of video data and using DIMD, a list of intra modes using reconstructed samples of neighboring blocks; construct, for the current block, a MPM list, wherein constructing the MPM list comprises inserting, into the MPM list, at least one intra mode from the derived list of intra modes; select, for the current block and from the MPM list, a candidate intra mode; and encode, for the current block, one or more syntax element that specify the candidate intra mode.

The details of one or more examples are set forth in the accompanying drawings and the description below. Other features, objects, and advantages will be apparent from the description, drawings, and claims.

DETAILED DESCRIPTION

Video coding standards include ITU-T H.261, ISO/IEC MPEG-1 Visual, ITU-T H.262 or ISO/IEC MPEG-2 Visual, ITU-T H.263, ISO/IEC MPEG-4 Visual (MPEG-4 Part 2), ITU-T H.264 (also known as ISO/IEC MPEG-4 AVC), including its Scalable Video Coding (SVC) and Multiview Video Coding (MVC) extensions, ITU-T H.265 (also known as ISO/IEC MPEG-4 HEVC) with its extensions, and Video Coding (VVC) standardization activity (also known as ITU-T H.266).

In JVET-L0164 "CE3-related: Decoder-side Intra Mode Derivation" Joint Video Experts Team (JVET) of ITU-T SG 16 WP 3 and ISO/IEC JTC 1/SC 29/WG 11, 12th Meeting: Macao, CN, 3-12 Oct. 2018, Document: JVET-L0164 (available at https://jvet-experts.org/doc_end_user/documents/12_Macao/wg11/JVET-L0164-v2.zip), JVET-M0094 "CE3: Decoder-side Intra Mode Derivation (tests 3.1.1, 3.1.2, 3.1.3 and 3.1.4)" Joint Video Experts Team (JVET) of ITU-T SG 16 WP 3 and ISO/IEC JTC 1/SC 29/WG 11, 13th Meeting: Marrakech, MA, 9-18 Jan. 2019, Document: JVET-M0094 (https://jvet-experts.org/doc_end_user/documents/13_Marrakech/wg11/JVET-M0094-v2.zip), JVET-N0342 "Non-CE3: Decoder-side Intra Mode Derivation with Prediction Fusion" Joint Video Experts Team (JVET) of ITU-T SG 16 WP 3 and ISO/IEC JTC 1/SC 29/WG 11, 14th Meeting: Geneva, CH, 19-29 Mar. 2019, Document: JVET-N0342 (https://jvet-experts.org/doc_end_user/documents/14_Geneva/wg11/JVET-N0342-v5.zip), JVET-O0449 "Non-CE3: Decoder-side Intra Mode Derivation with Prediction Fusion Using Planar" Joint Video Experts Team (JVET) of ITU-T SG 16 WP 3 and ISO/IEC JTC 1/SC 29/WG 11, 15th Meeting: Gothenburg, SE, 3-12 Jul. 2019, Document: JVET-O0449 (https://jvet-experts.org/doc_end_user/documents/15_Gothenburg/wg11/JVET-O0449-v2.zip), decoder side intra mode derivation (DIMD) is proposed as a coding tool for intra prediction. A difference from existing intra prediction tools is that, when performing DIMD, a video coder may not explicitly signal intra mode. Instead, the video coder may implicitly derive intra mode using reconstructed samples of neighboring blocks. The purpose is for coding efficient improvement by saving signalling of intra mode. Note that DIMD may only apply to luma. For chroma, classical intra coding mode may apply.

Figure 5:
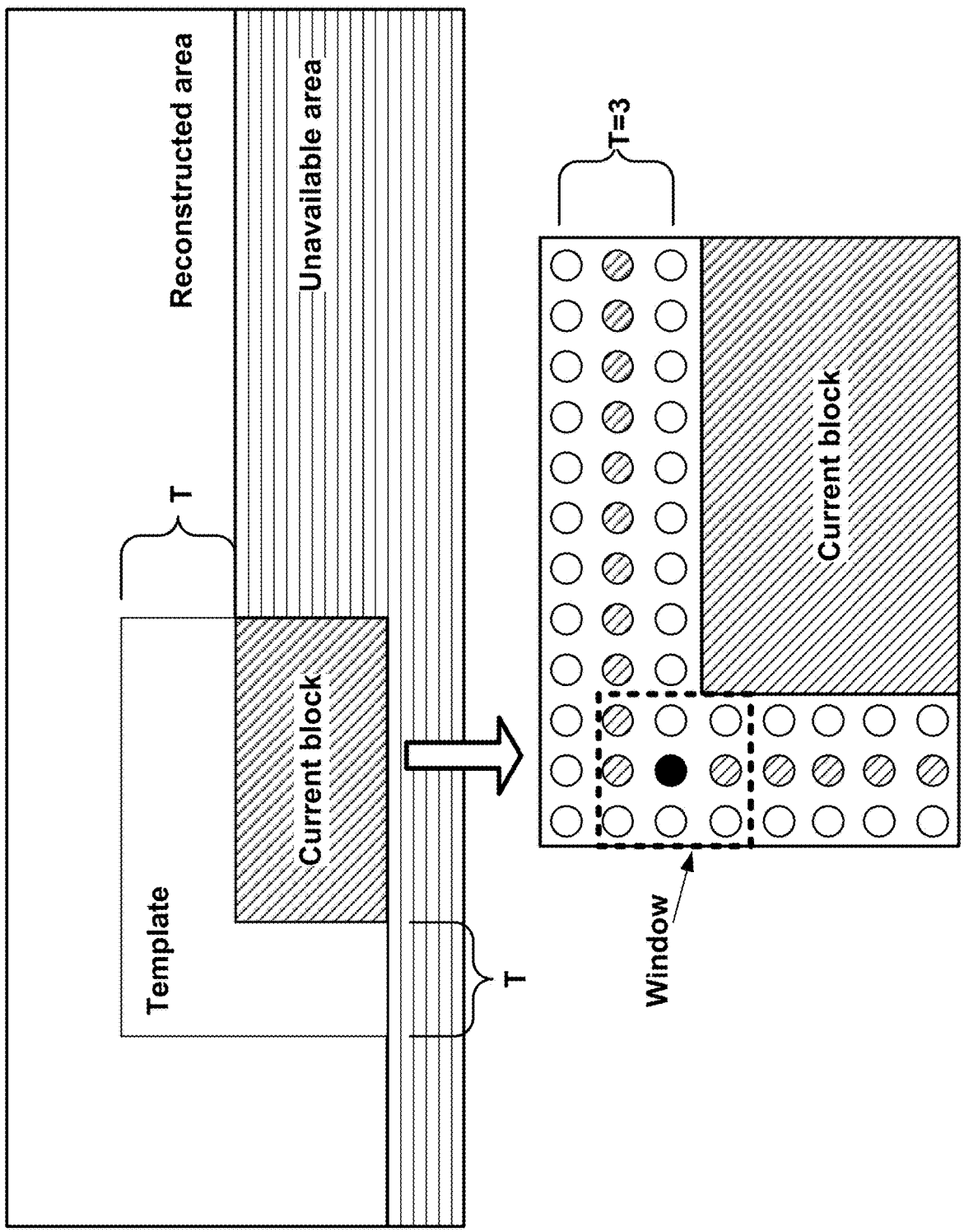
FIG. 5 is a conceptual diagram illustrating a set of pixels on which a video coder may perform a gradient analysis.

In some examples, to perform DIMD for a current block, a video coder may perform gradient calculation to derive one or more possible modes (e.g., M1 and M2). The video coder may then predict the current block using each of the derived one or more possible modes to generate intermediate prediction blocks, and generate an output prediction as a function of the intermediate prediction blocks. Details of an example DIMD workflow are as follows:

A video coder may perform gradient calculation of reconstructed samples of neighboring blocks. To derive the intra prediction mode for a block, the video coder may select a set of neighboring pixels from neighboring reconstructed luma samples as shown in FIG. 5. The video coder may then apply gradient calculation to the center pixel of every 3×3 window formed by the set of neighboring pixels. Note that if a neighboring pixel is not reconstructed, its gradient values may not be calculated.

The video coder may perform gradient calculation using Sobel filters (denoted as "Mx", "My"). Dot production between these 2 filters and each 3×3 window (denoted as "W") may be performed to derive horizontal and vertical gradients (denoted as "Gx", "Gy") respectively. The following may be examples of such filters:

$$M_x = \begin{bmatrix} -1 & 0 & 1 \\ -2 & 0 & 2 \\ -1 & 0 & 1 \end{bmatrix} \text{ and } M_y = \begin{bmatrix} -1 & -2 & -1 \\ 0 & 0 & 0 \\ 1 & 2 & 1 \end{bmatrix}$$

Gx=Mx*W and Gy=My*W.

The video coder may map gradient values to a direction. For instance, the video coder may derive the intensity (G) and the orientation (O) for each window using Gx and Gy:

$$G = |G_x| + |G_y| \text{ and } O = atan\left(\frac{G_y}{G_x}\right)$$

Figure 6:
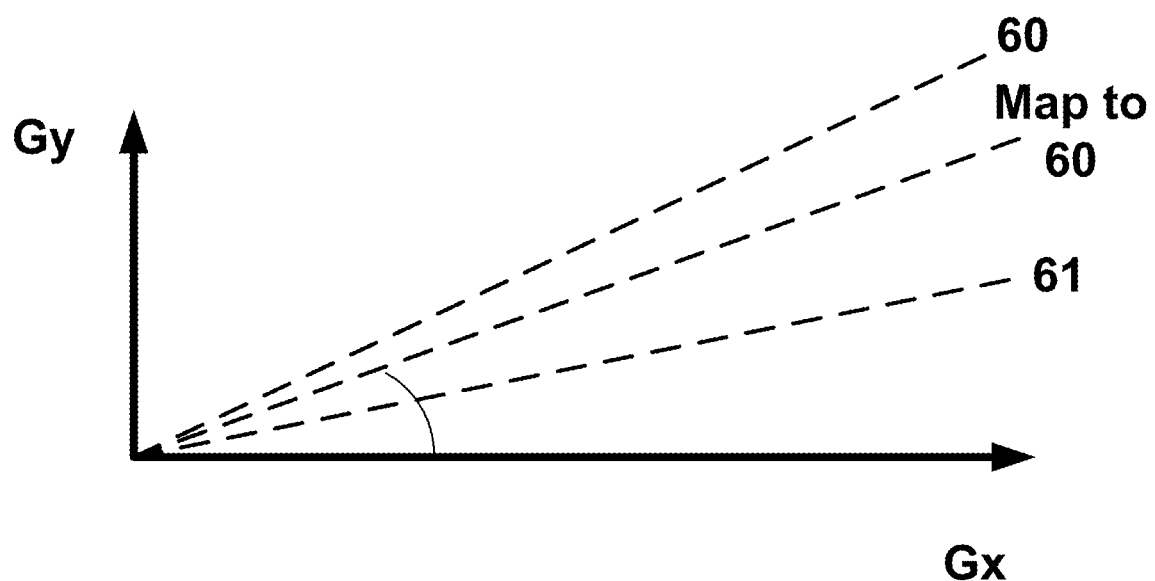
FIG. 6 is a graph illustrating an example of orientation index mapping using horizontal and vertical gradient.

In some examples, to reduce the computational cost of the operation arctangent ("atan"), the orientation may be represented by an index value (in range of 2 to 66) using a mapping table "atan", and it may be estimated by comparing the mapping table and Gy/Gx; if Gy/Gx falls into the range of (atan[i], atan[i+1]), the orientation is assigned value "i". Note that intensity G is 0, O is assigned to 0 (planar mode) by default. FIG. 6 is a graph illustrating an example of orientation index mapping using horizontal and vertical gradients.

In the example of FIG. 6, for a given 3×3 window, it (e.g., the index value) satisfies:

angTable[60]<=$G_y/G_x$<angTable[61]

The orientation may be mapped to prediction direction 60.

Figure 7:
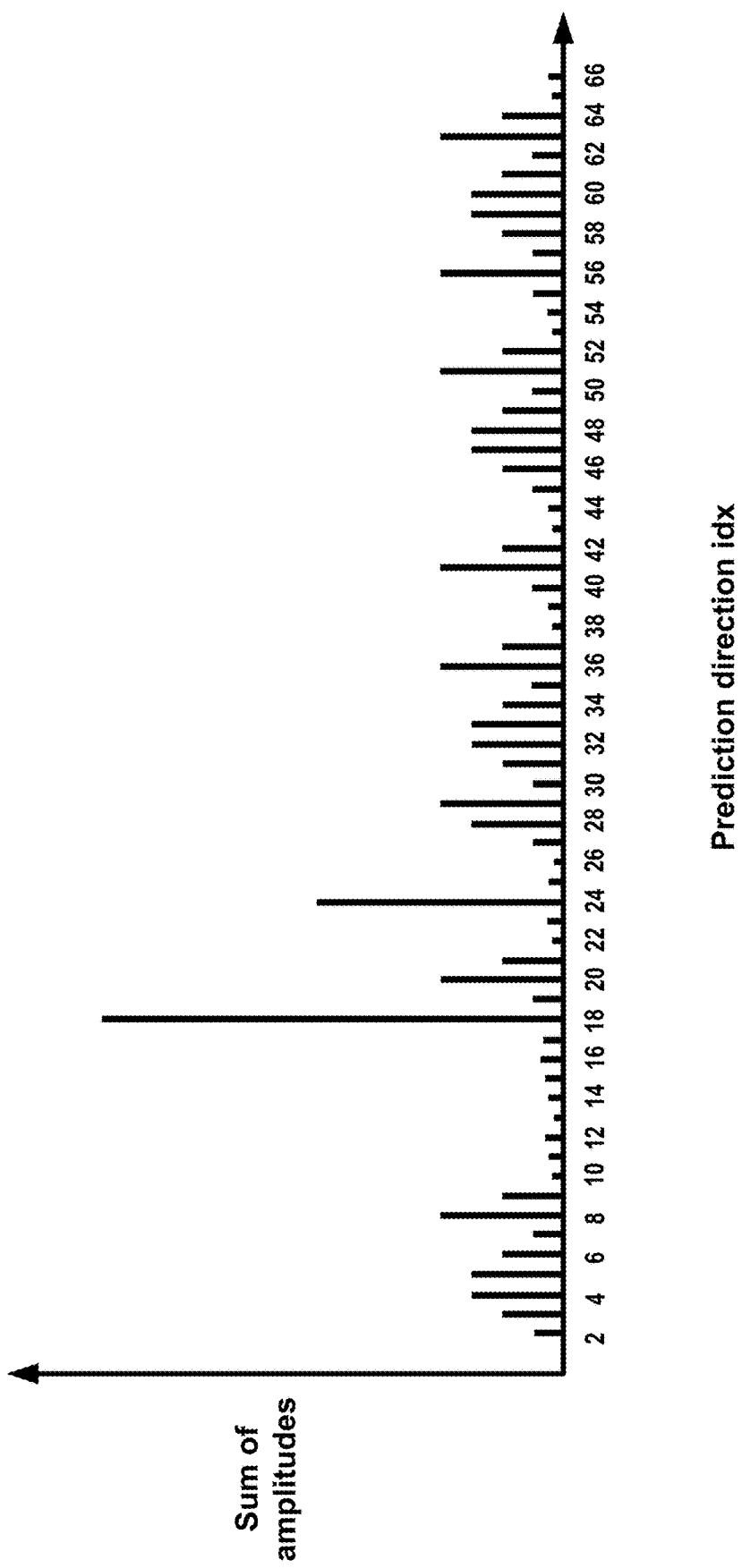
FIG. 7 is a graph illustrating a selection of two most possible prediction modes.

The video coder may perform selection of two most possible modes. The video coder may accumulate the intensity values for each orientation index of all 3×3 windows. The video coder may select the top two directions with highest sum as two most possible modes (denote mode of highest sum as a first mode "M1" and second highest as a second mode "M2"). Note that If values are all zero, planar mode will be selected. FIG. 7 is a graph illustrating a selection of two most possible prediction modes. In the example of FIG. 7, the video coder may select mode 18 at the first mode M1 and mode 24 as the second mode M2 as 18 and 24 are, respectively, the first and second highest sums of amplitudes.

Figure 8:
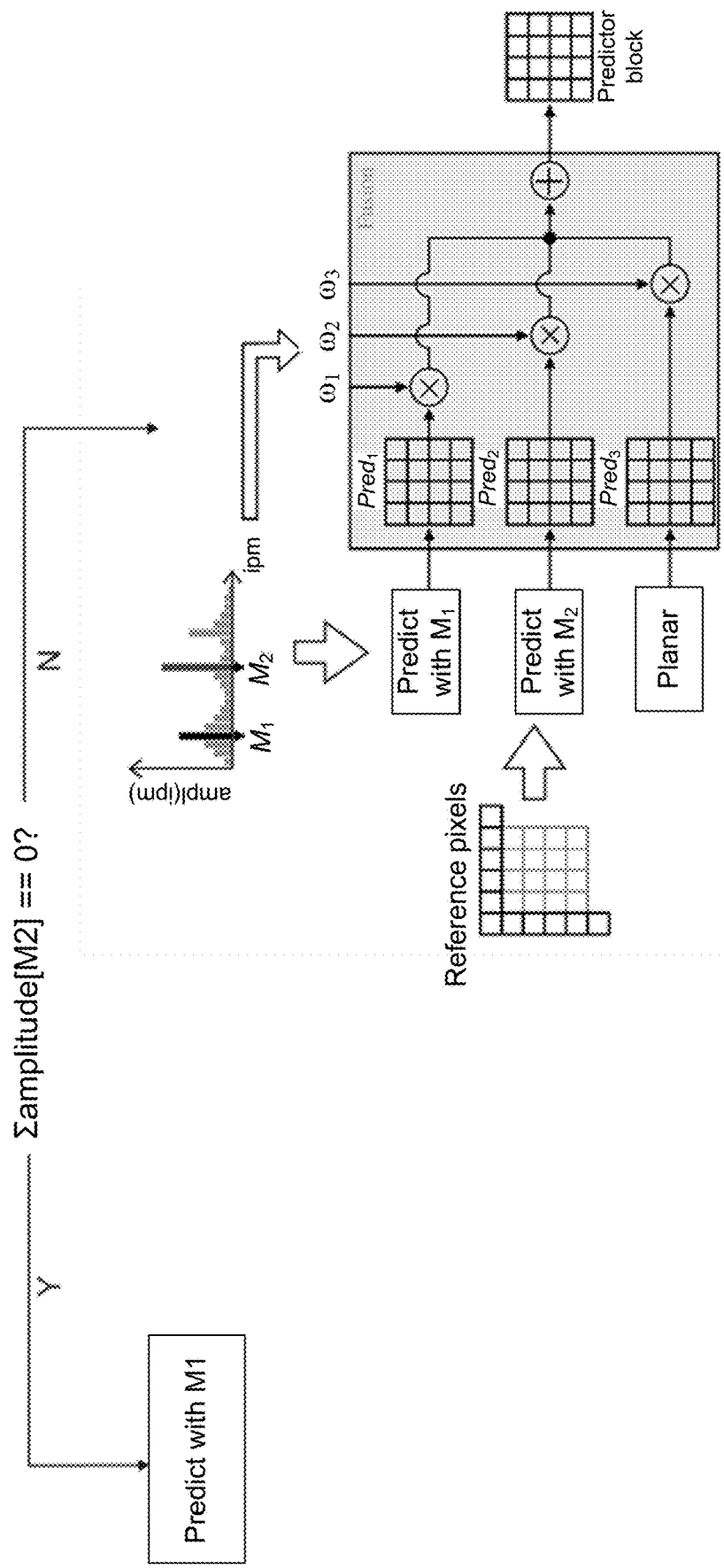
FIG. 8 is a conceptual diagram illustrating example prediction for decoder side intra mode derivation (DIMD) mode.

The video coder may perform prediction of DIMD. As shown in FIG. 8, if sum of amplitudes of second most possible mode is 0 (e.g., if Σamplitude[M2]==0), the video coder may perform normal intra prediction may be performed with mode M1; otherwise, the video coder may generate an output prediction block as a weighted sum of three prediction blocks (M1, M2, and Planar mode). This may be referred to as performing a blended prediction (e.g., as the modes are blended to generate a single prediction). As one example, the video coder may generate a weight for each of the prediction blocks (e.g., $\omega_1$ for M1, $\omega_2$ for M2, and ω3 for Planar mode) in accordance with the following equations:

$$\omega_1 = \frac{43}{64} \times \frac{ampl(M_1)}{ampl(M_1) + ampl(M_2)}$$

$$\omega_2 = \frac{43}{64} \times \frac{ampl(M_2)}{ampl(M_1) + ampl(M_2)}$$

$$\omega_3 = \frac{21}{64}$$

The video coder may generate intermediate prediction blocks (e.g., $Pred_1$ for M1, $Pred_2$ for M2, and $Pred_3$ for Planar mode) based on reference pixels. The video coder may apply the weights to the intermediate prediction blocks to generate the output prediction block in accordance with the following equation:

$\Sigma_{i=1}^{3} \omega_i \times Pred_i$

Figure 9A:
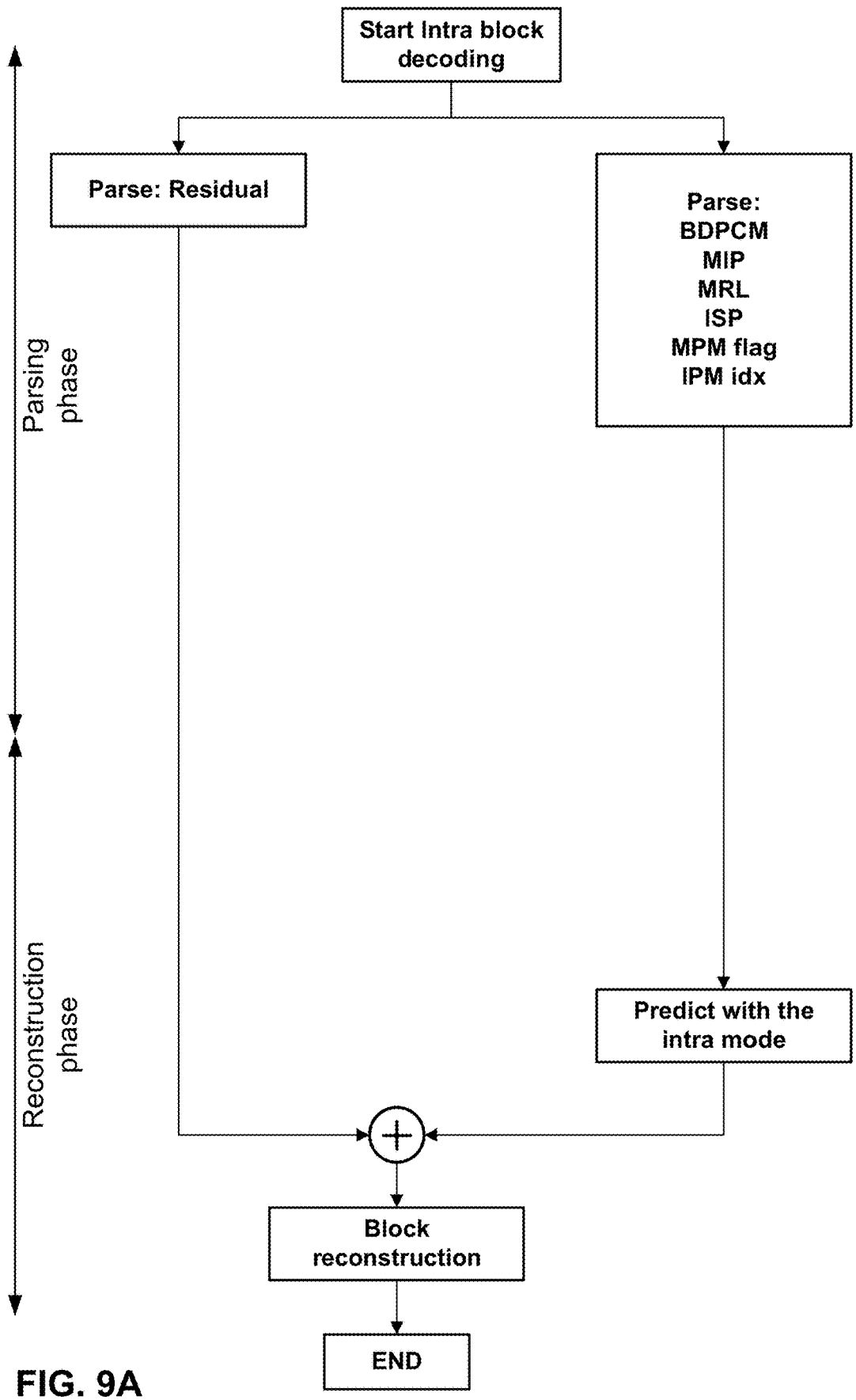
FIG. 9A is a flow diagram illustrating an example technique for intra block decoding.
Figure 9B:
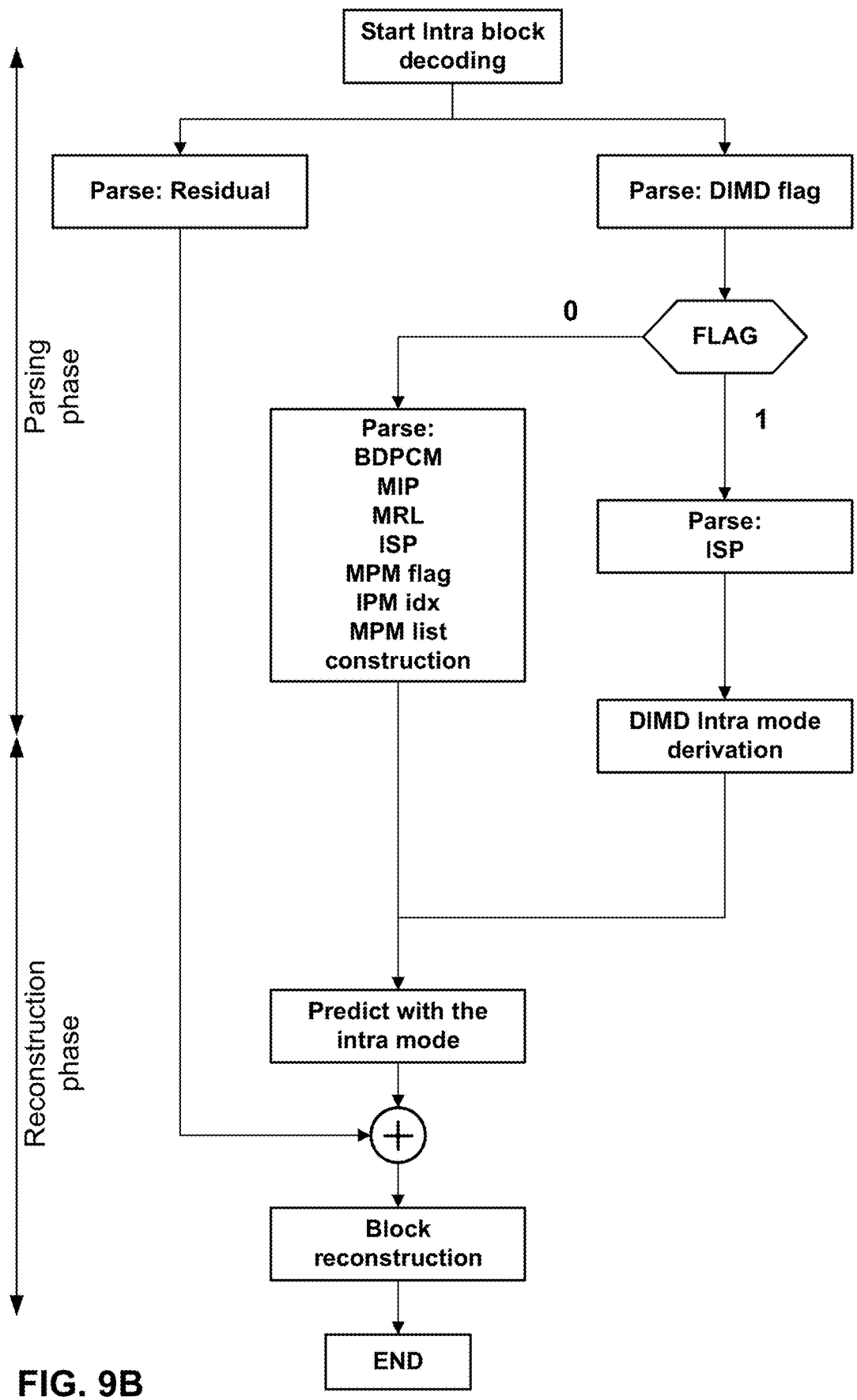
FIG. 9B is a flow diagram illustrating an example technique for intra block decoding with DIMD.

The video coder may perform signalling of DIMD mode. FIG. 9A is a flow diagram illustrating an example Intra coding process of VVC, and FIG. 9B modifications to the process of FIG. 9A when DIMD is included. As shown in FIG. 9B, a video decoder may parse a DIMD flag. If the DIMD flag is true (e.g., has a value of 1), the video decoder may derive the intra prediction modes and perform prediction as explained above. If the DIMD flag is false (e.g., has a value of 0), the video decoder may parse the intra prediction mode from the bitstream (e.g., construct a MPM list and signal an index into the MPM list) and perform prediction accordingly. As such, in the example of FIG. 9B, where the DIMD flag is false, the video decoder may not perform DIMD intra mode derivation.

The aforementioned DIMD mechanism may present one or more disadvantages. For instance, the potential of DIMD may not be fully utilized for a number of reasons. As one example, DIMD prediction implicitly determines whether the prediction shall be a blended prediction from a plurality of modes or from a single mode. The aforementioned DIMD mechanism might sacrifice robustness wherein the optimal prediction mode is DIMD derived mode but optimal prediction might be from a single prediction only. As another example, in other cases, the optimal intra mode intra mode might be different from DIMD derived mode but the difference is small (1 or 2 index differences). Using normal mode index coding costs more bits but using DIMD derived mode does not leads to best RD performance.

In accordance with one or more techniques of this disclosure, a video coder (e.g., a video encoder and/or a video decoder) may insert DIMD derived modes into a MPM list. As such, a video coder may code a block using DIMD derived mode in MPM list for intra prediction.

Figure 10:
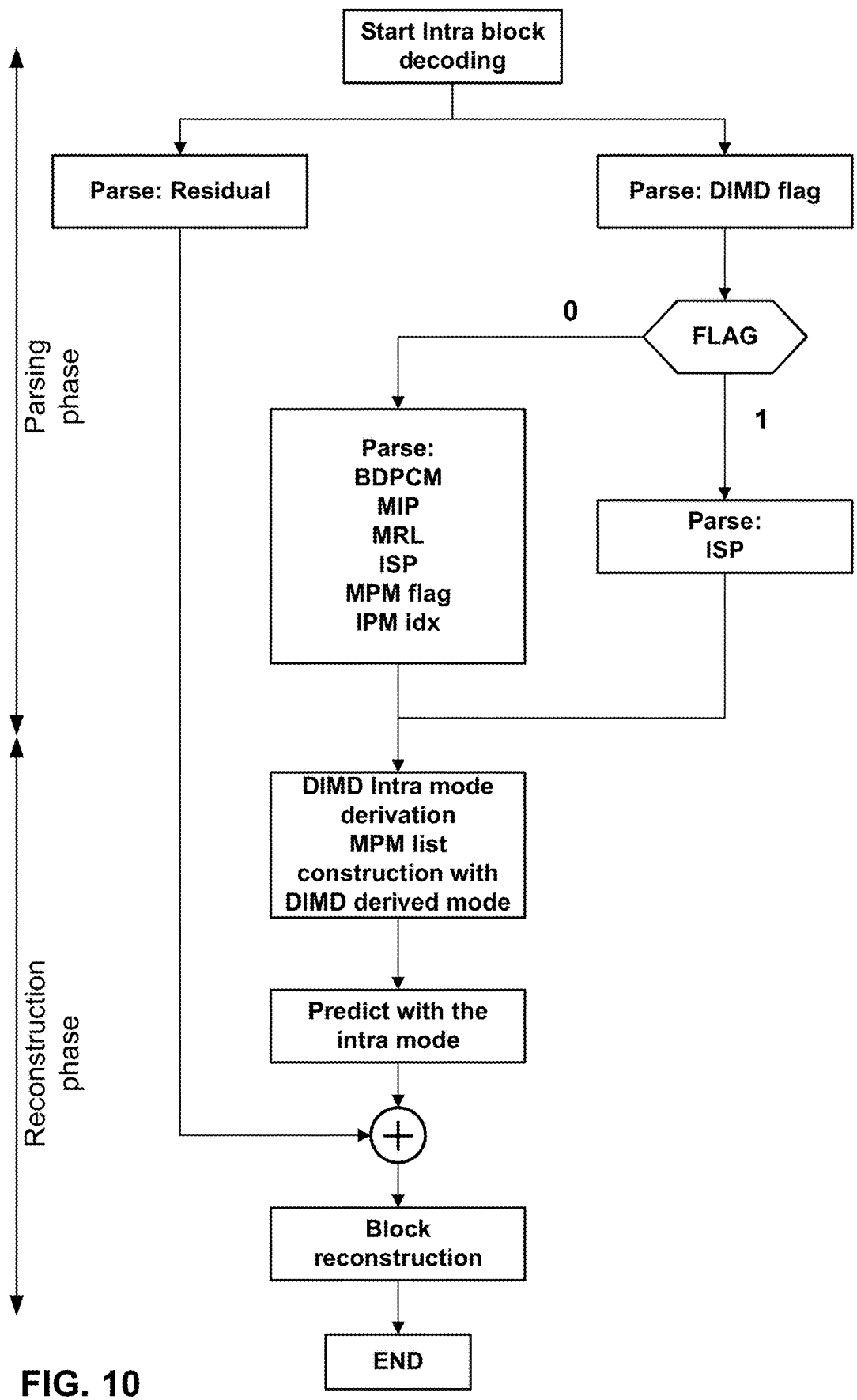
FIG. 10 is a flow diagram illustrating an example technique for intra block decoding with DIMD most probable mode (MPM) list construction, in accordance with one or more techniques of this disclosure.

FIG. 10 is a flow diagram illustrating an example technique for intra block decoding with DIMD most probable mode (MPM) list construction, in accordance with one or more techniques of this disclosure. A comparison of FIGS. 10 and 9B yields several differences. For instance, compared with JVET DIMD design (FIG. 9), a video coder performing the techniques of this disclosure (FIG. 10) may perform DIMD mode derivation regardless whether current block is predicted using DIMD mode, and the derived modes are added into MPM list (MPM list construction process is therefore postponed after DIMD process).

For blocks with DIMD flag equal to true, the video coder may perform DIMD prediction as explained above. For blocks with DIMD flag equal to false, the video coder may perform normal intra prediction, and add DIMD derived mode into MPM list. As such, the video coder may use DIMD derived mode for prediction for a block with MPM flag equal to true.

By performing the technique of FIG. 10, a video coder may further extend the potential of DIMD and may contribute to coding efficiency improvement, a block might use DIMD derived mode and perform normal prediction by selecting DIMD derived mode (or DIMD derived mode with an offset) in MPM list.

Figure 11:
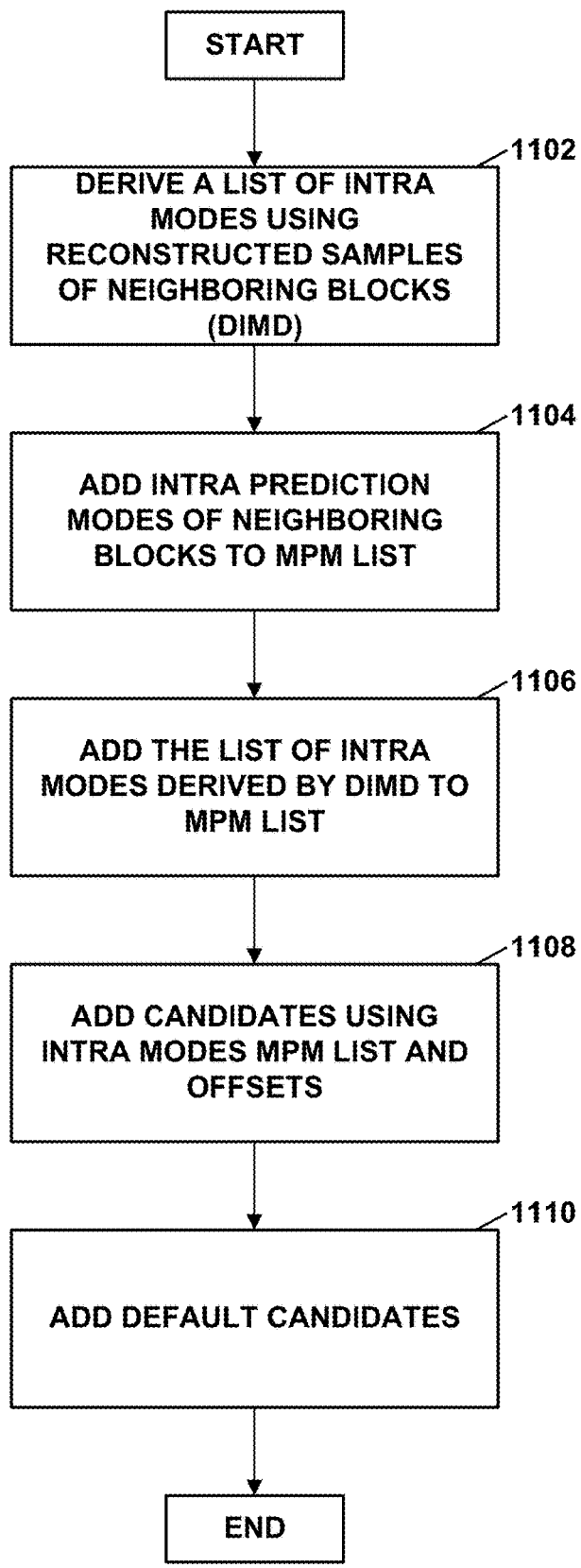
FIG. 11 is a flow diagram illustrating an example technique of MPM list construction, in accordance with one or more techniques of this disclosure.

FIG. 11 is a flow diagram illustrating an example technique of MPM list construction/derivation, in accordance with one or more techniques of this disclosure. The techniques of FIG. 11 may be performed by a video coder, such as video encoder 200 and/or video decoder 300.

As shown in FIG. 11, in step 1 (1102), the video coder may derive a list of intra modes using reconstructed samples of neighboring blocks by DIMD. In step 2 (1104), the video coder may add prediction modes from neighboring blocks into MPM list. In step 3 (1106), the video coder may add the list of intra modes derived by DIMD into MPM list. In step 4 (1108), the video coder may add more candidates into MPM list using the list of candidates. An example method is to add a plurality of offsets (in range of −3 to 3) to all the candidates in the list, or some of the candidates in the list (for example, first 3 candidates). In step 5 (1110), the video coder may add default intra modes (DC, planar, horizontal, vertical etc. modes) into MPM list (e.g., insert As such, steps 4 and/or 5 of FIG. 11 illustrates steps in which the video coder may insert, into the MPM list and after the at least one intra mode from the derived list of intra modes, additional intra mode candidates, which may be one or more default candidates. Additionally or alternatively, step 2 may illustrate a step in which the video coder may insert into the MPM list and before the at least one intra mode from the derived list of intra modes, one or more intra mode candidates that are prediction modes from neighboring blocks of the current block.

Figure 12:
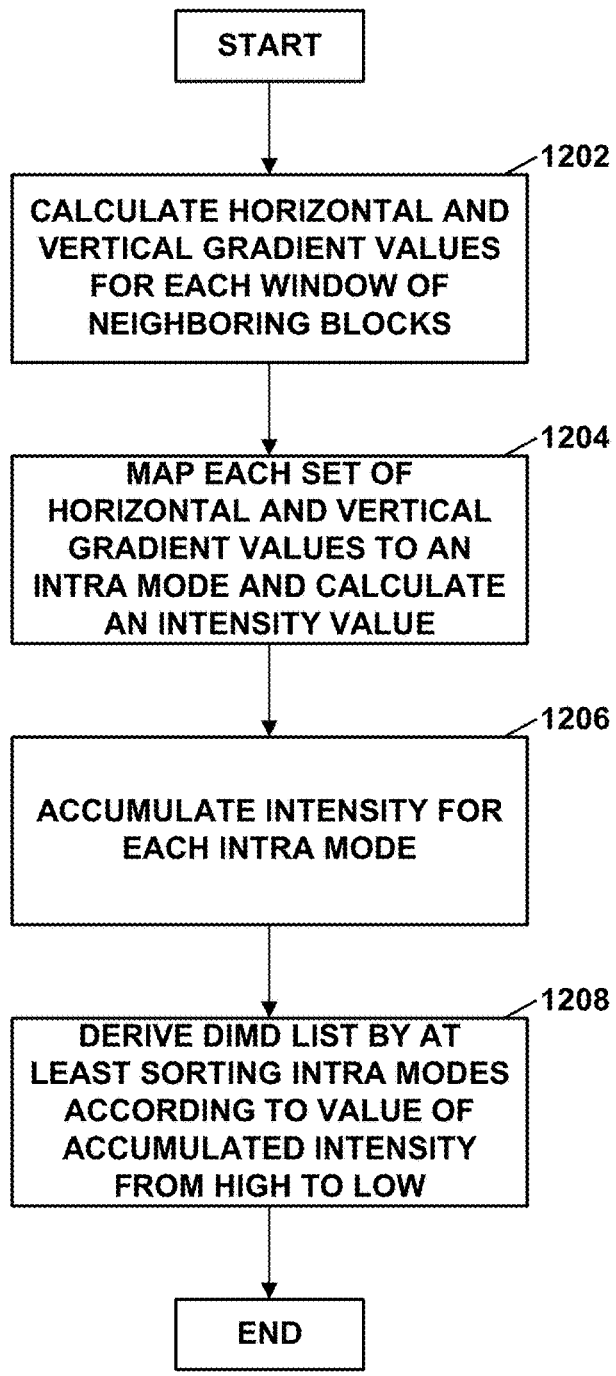
FIG. 12 is a flow diagram illustrating an example technique of deriving a list of intra mode by DIMD, in accordance with one or more techniques of this disclosure.

FIG. 12 is a flow diagram illustrating an example technique of deriving a list of intra mode by DIMD, in accordance with one or more techniques of this disclosure.

The techniques of FIG. 12 may be performed by a video coder, such as video encoder 200 and/or video decoder 300. The technique of FIG. 12 may be an example of step 1 (1102) of the technique of FIG. 11.

In 1202, the video coder may calculate horizontal and vertical gradient values of Each window of neighboring blocks as Gx and Gy. FIG. 5 illustrates an example window. In 1204, for each set of horizontal and vertical gradient values, the video coder may derive the intensity (|Gx|+|Gy|) and orientation values (Gy/Gx) and map each orientation to an intra mode in range of 2 to 66 (example process is given above). The video coder may also calculate the intensity value as sum of absolute values of horizontal and vertical gradient values, the intensity value may also be calculated as sum of square values of horizontal and vertical gradient values. In 1206, for each intra mode, the video coder may accumulate its corresponding intensity values. In 1208, the video coder may sort the intra modes according to the accumulated intensity values from high to low. The DIMD list may be the sorted list of intra modes, or only contain partial of the list. The DIMD list can exclude intra modes with sum of intensity values equal to 0. The DIMD list can exclude intra modes with sum of intensity values less than a threshold. The size of the list can be 0, 1, 2, or more. The first candidate can be set to DC or planar mode if all sum of intensity values are 0.

Figure 13:
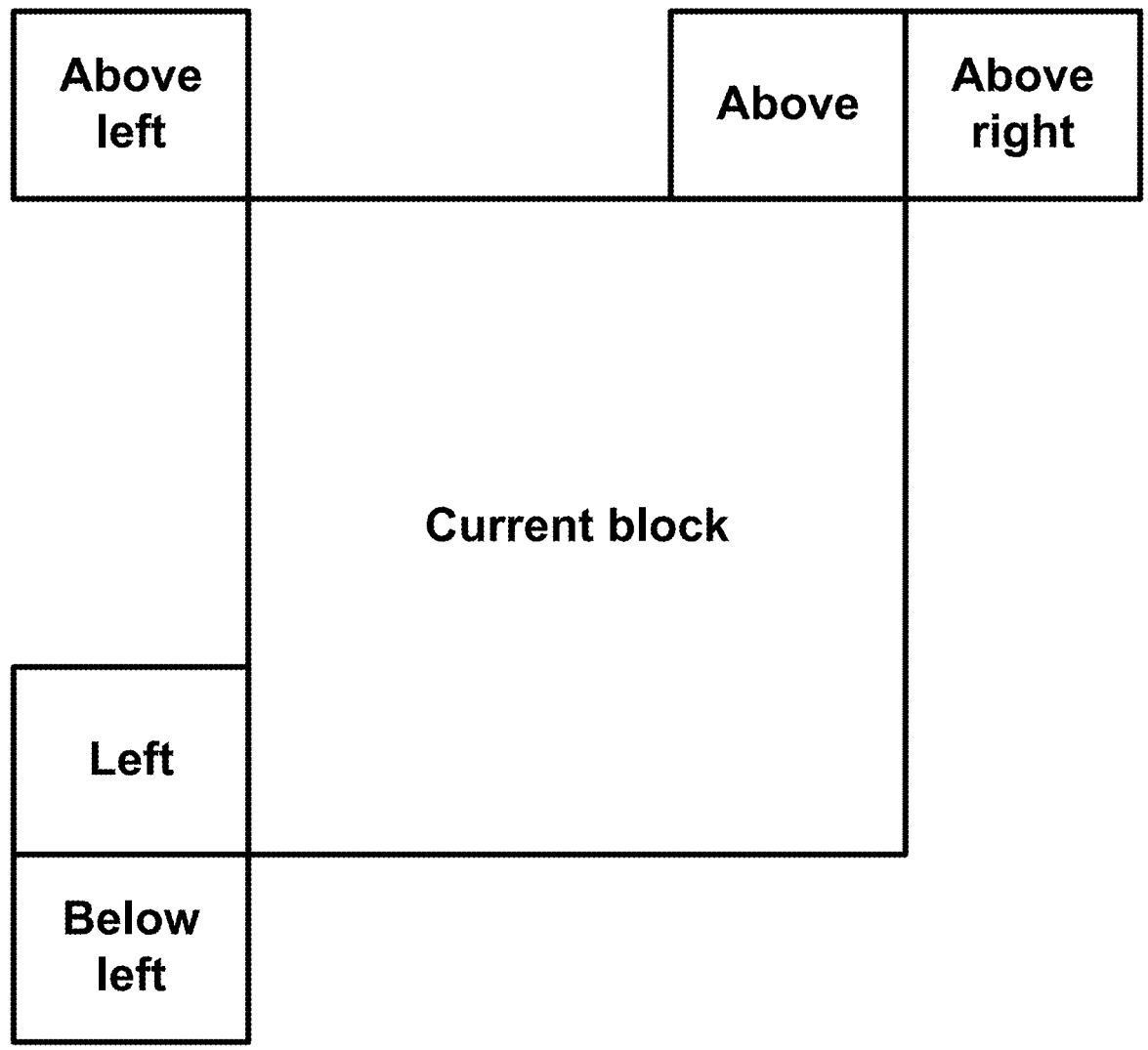
FIG. 13 is a conceptual diagram illustrating examples of neighboring blocks.

As shown above in FIG. 11, in 1104, the video coder may add intra prediction modes of neighboring blocks into MPM lists. Example neighboring blocks are left, above, above left, above right and below left blocks as shown in FIG. 13

Figure 14:
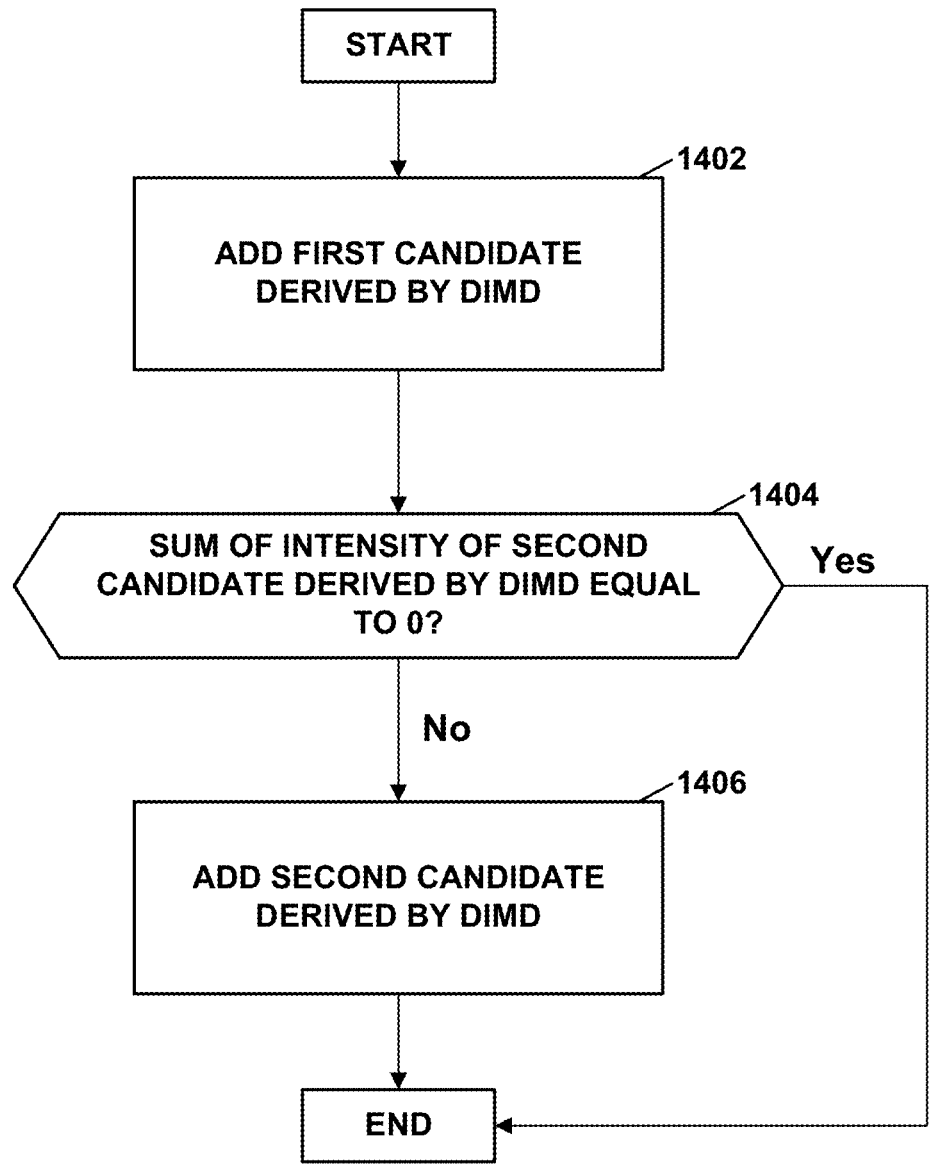
FIG. 14 is a flow diagram illustrating an example technique of adding DIMD derived modes into an MPM list, in accordance with one or more techniques of this disclosure.

FIG. 14 is a flow diagram illustrating an example technique of adding DIMD derived modes into MPM list, in accordance with one or more techniques of this disclosure. The techniques of FIG. 14 may be performed by a video coder, such as video encoder 200 and/or video decoder 300. The technique of FIG. 14 may be an example of step 3 of the technique of FIG. 11.

In 1402, the video coder may add the first candidate with highest sum of intensity (denoted as "M1" as explained above) into MPM list. In 1404, the video coder may determine whether the second candidate's sum of intensity is 0 (denoted as "M2" as explained above), if it is determined to be 0, the second candidate may be skipped; otherwise, 1406 will be performed. In 1406, the video coder may add the second candidate into MPM list.

Some example variations and/or alternatives follow:
1) In 1404, the video coder may determine whether the second candidate's sum of intensity is less than a threshold. If it is less than a threshold, the video coder may skip the second candidate; otherwise, the video coder may add the second candidate into MPM list construction.
2) 1404 condition may also be applied to the first candidate.
3) The order of the technique of FIG. 11 may be switched with each other or in an interleaved way. For example, 1106 may be performed before 1104, or DIMD derived modes and intra modes from neighboring blocks may be added in an interleaved way.
4) When a coder performs 1104 before 1102, the list of intra modes derived by DIMD may be pruned by intra modes from neighboring blocks; For example, if an intra mode has already been added into MPM list in 1104, the intra mode may be skipped when building the list of intra modes of DIMD lists.
5) In 4) if an intra mode has already been added into MPM list in 1104, any mode that equals to the intra mode plus an offset (the offset value may be from −3 to 3) will be skipped when building the list of intra modes of DIMD lists.
6) The list of intra modes derived by DIMD may also be sorted in a different order (for example, sum of intensity value from low to high and keep last few candidates)
7) Each candidate added into MPM list may be pruned to avoid duplicate modes added into MPM list.
8) The first candidate may be skipped if it is equal to DC or planar mode.

Some other example variations and/or alternatives follow:
1) DIMD flag may be signaled after MPM flag
2) DIMD flag may be signaled as one of MPM index
3) There may be only one mode derived by DIMD that is added into MPM list
4) There may be more than 2 modes derived by DIMD that are added into MPM list
5) DIMD may also be applied to chroma block
6) DIMD derived mode may also be added into chroma MPM list
7) Intra prediction might always use a single prediction mode
8) In the case of 7) DIMD flag might not be signalled
9) DIMD prediction might only uses a single mode
10) DIMD prediction might be a blended prediction of a derived mode and planar mode
11) DIMD prediction might be a blended prediction of derive mode (s) and DC mode
12) DIMD may use prediction sample instead of reconstructed samples for mode derivation
13) If a block is of DIMD mode, its prediction mode derived by DIMD may be used for MPM list construction of neighboring blocks.
14) If a block is of DIMD mode, a default mode (DC or planar) may be used for MPM list construction of neighboring blocks.

Figure 1:
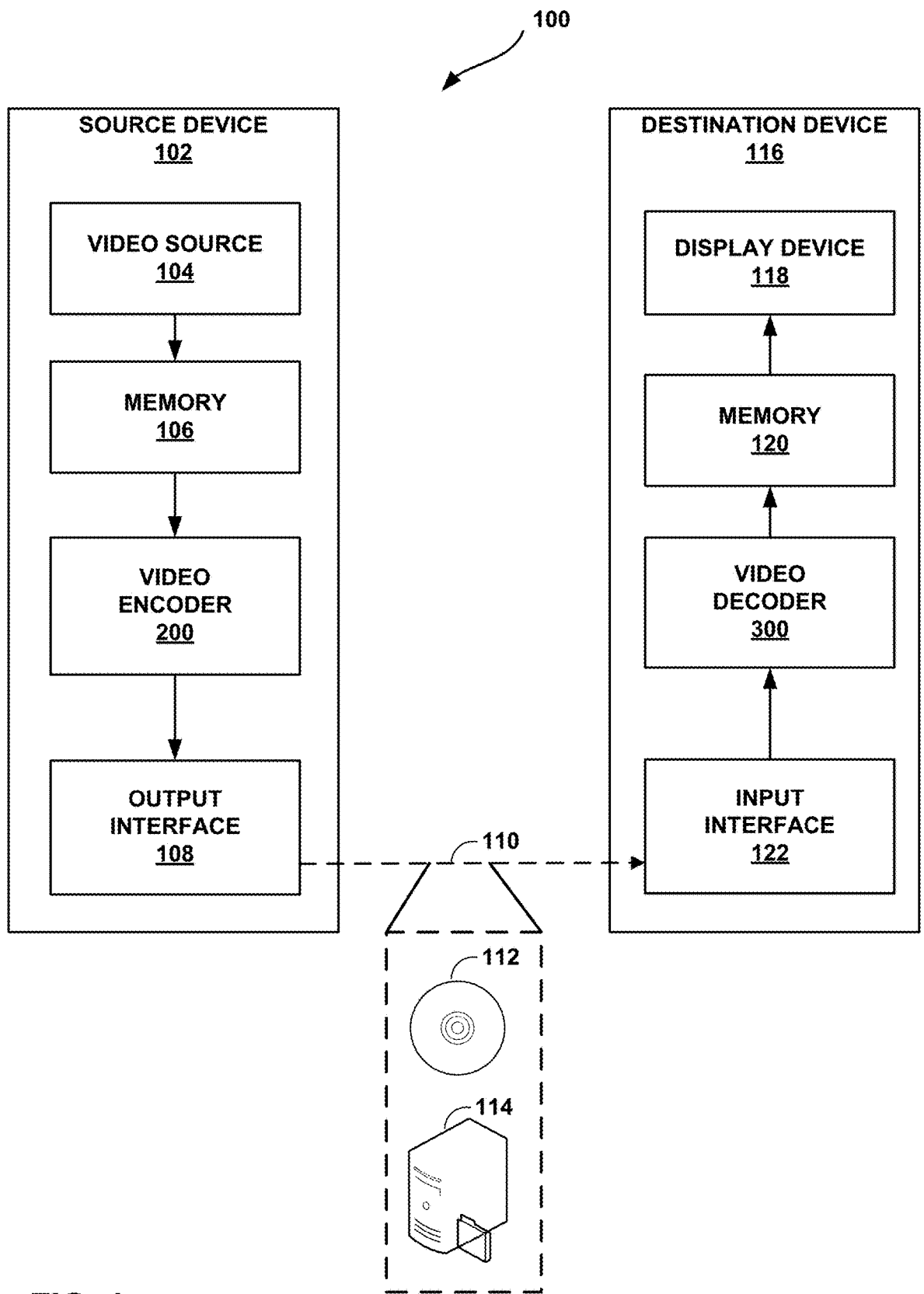
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for intra mode derivation for most probably mode list construction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for intra mode derivation for most probably mode list construction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, $20^{th}$ Meeting: by teleconference, 7-16 Oct. 2020, JVET-T2001-v2 (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with one or more techniques of this disclosure, a video coder (e.g., a video encoder and/or a video decoder) may insert DIMD derived modes into a MPM list. As such, a video coder may code a block using DIMD derived mode in MPM list for intra prediction.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with one or more techniques of this disclosure, encoder 200 and/or decoder 300 may insert one or more derived DIMD modes into an MPM list. For instance, encoder 200 and/or decoder 300 may perform the technique of FIG. 10.

Figure 2A:
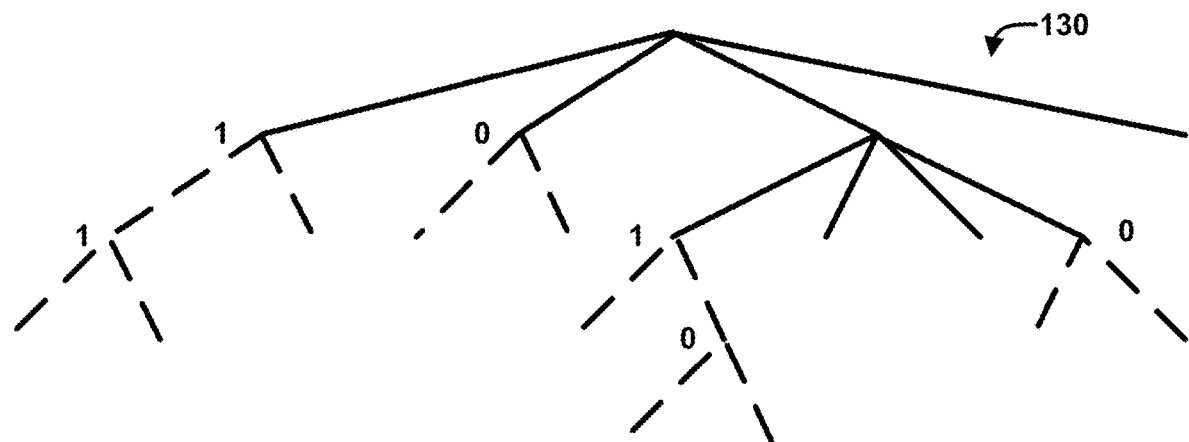
FIGS. 2A and 2B are conceptual diagrams illustrating an example quadtree binary tree (QTBT) structure, and a corresponding coding tree unit (CTU).
Figure 2B:
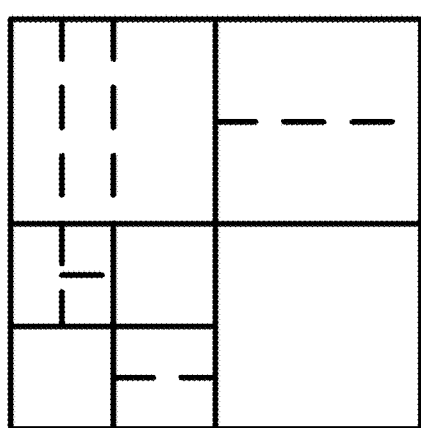

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

Figure 3:
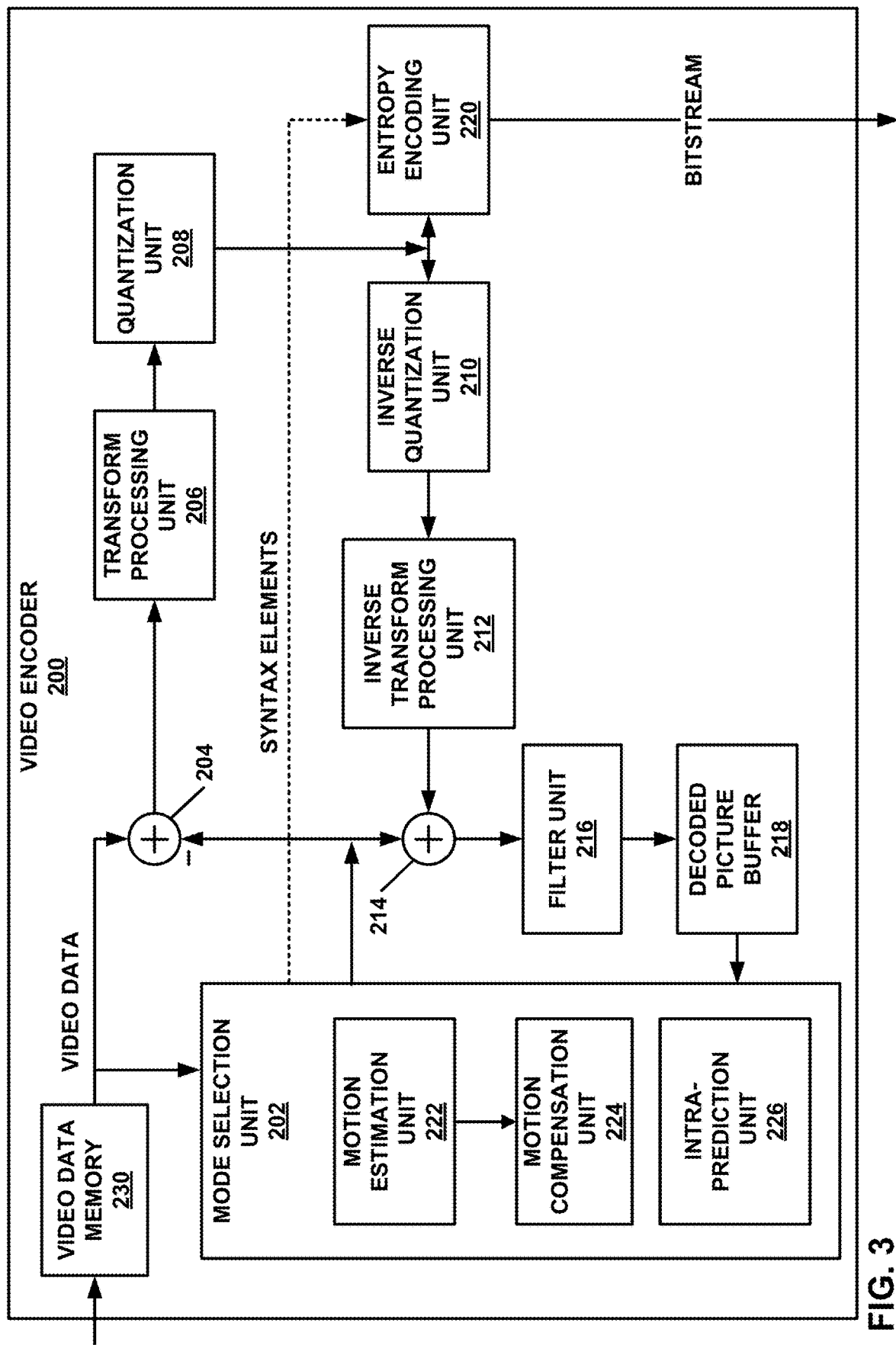
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to derive, for a current block of video data and using decoder side intra mode derivation (DIMD), a list of intra modes using reconstructed samples of neighboring blocks; construct, for the current block, a most possible mode (MPM) list that includes at least one intra mode from the derived list of intra modes; and predict, using a candidate selected from the constructed MPM list, the current block.

Figure 4:
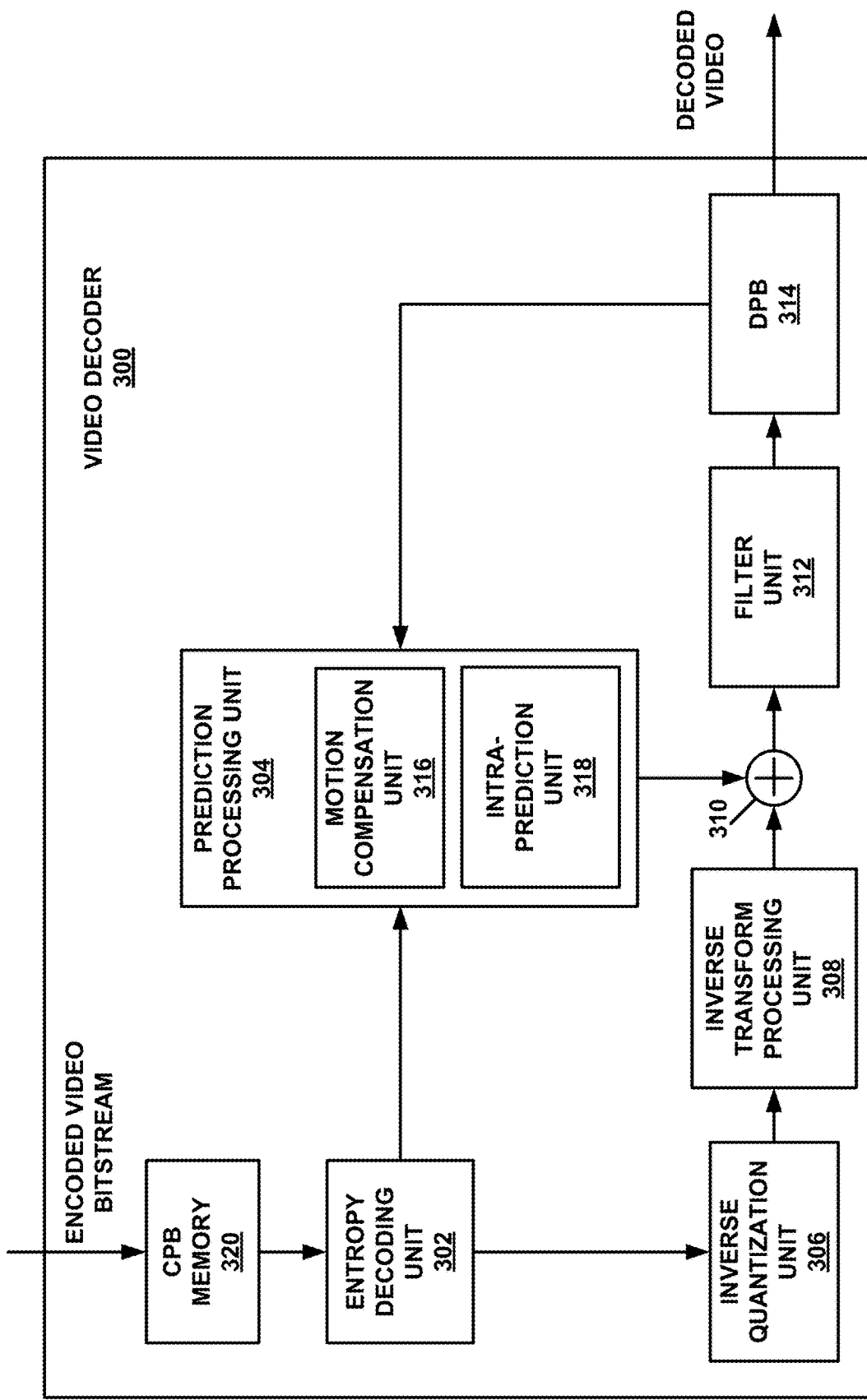
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to derive, for a current block of video data and using decoder side intra mode derivation (DIMD), a list of intra modes using reconstructed samples of neighboring blocks; construct, for the current block, a most possible mode (MPM) list that includes at least one intra mode from the derived list of intra modes; and predict, using a candidate selected from the constructed MPM list, the current block.

Figure 15:
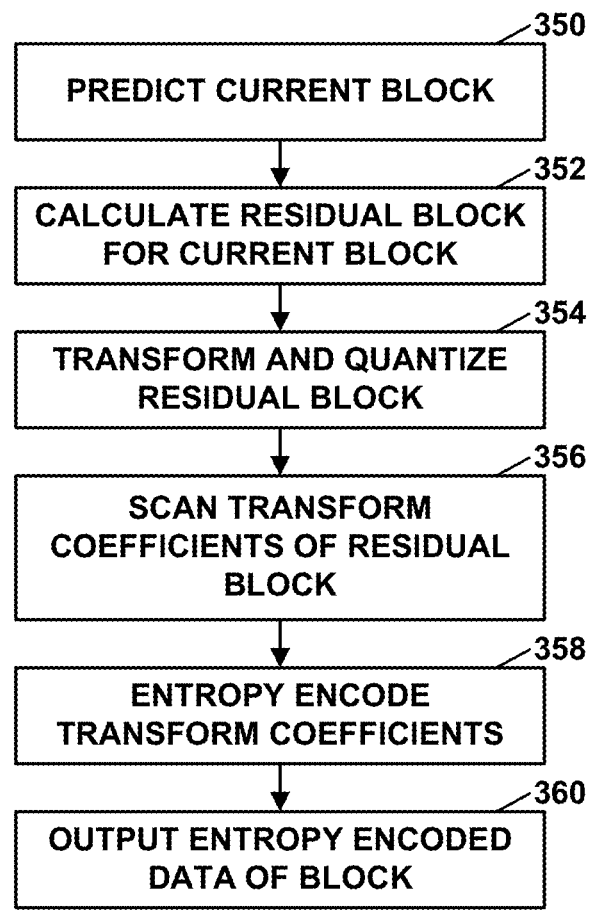
FIG. 15 is a flowchart illustrating an example method for encoding a current block in accordance with the techniques of this disclosure.

FIG. 15 is a flowchart illustrating an example method for encoding a current block in accordance with the techniques of this disclosure. The current block may comprise a current CU. Although described with respect to video encoder 200 (FIGS. 1 and 3), it should be understood that other devices may be configured to perform a method similar to that of FIG. 15.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 16:
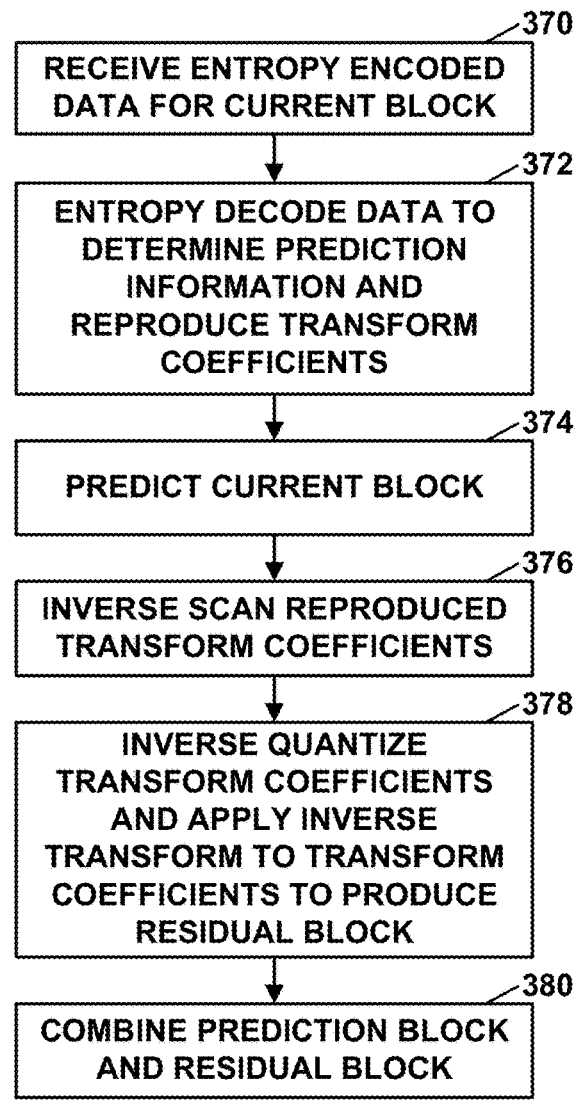
FIG. 16 is a flowchart illustrating an example method for decoding a current block in accordance with the techniques of this disclosure.

FIG. 16 is a flowchart illustrating an example method for decoding a current block of video data in accordance with the techniques of this disclosure. The current block may comprise a current CU. Although described with respect to video decoder 300 (FIGS. 1 and 4), it should be understood that other devices may be configured to perform a method similar to that of FIG. 16.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 17:
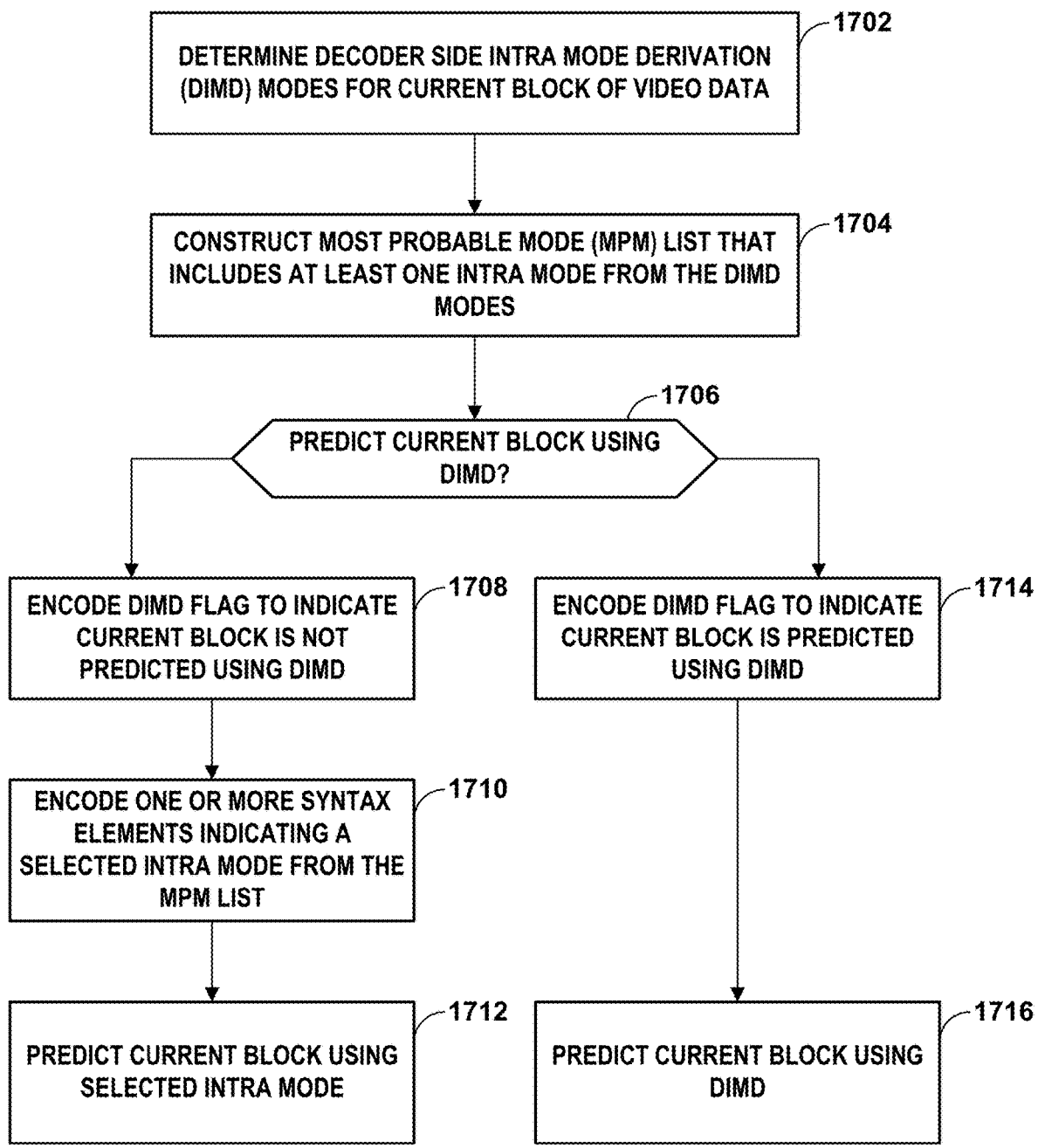
FIG. 17 is a flowchart illustrating an example technique for encoding video data using DIMD, in accordance with one or more techniques of this disclosure.

FIG. 17 is a flowchart illustrating an example technique for encoding video data using DIMD, in accordance with one or more techniques of this disclosure. Although described with respect to video encoder 200 (FIGS. 1 and 3), it should be understood that other devices may be configured to perform a method similar to that of FIG. 17.

Video encoder 200 may derive, for a current block of video data, a list of decoder side intra mode derivation (DIMD) intra modes using reconstructed samples of neighboring blocks (1702). For instance, intra-prediction unit 226 may derive the DIMD intra modes using the technique discussed above with reference to FIG. 7 to obtain a first DIMD intra mode M1 and a second DIMD intra mode M2.

Video encoder 200 may construct, for the current block, a most probable mode (MPM) list that includes at least one intra mode from the DIMD modes (1704). For instance, intra-prediction unit 226 may construct the MPM list using the technique discussed above with reference to FIG. 11. The constructed MPM list may include one or both of the first DIMD intra mode M1 and the second DIMD intra mode M2.

Video encoder 200 may determine whether to predict the current block using DIMD (1706). For instance, mode selection unit 202 may perform analysis to determine an optimal encoding mode for the current block (e.g., a coding mode that uses the fewest bits to represent the current block). To determine the optimal encoding mode, mode selection unit 202 may test encoding the current block using various modes. Where mode selection unit 202 determines that encoding the current block using DIMD is optimal, mode selection unit 202 may determine to encode the current block using DIMD. Similarly, where mode selection unit 202 determines that encoding the current block using one of the derived DIMD modes in the MPM list, mode selection unit 202 may determine not the encode the current block using DIMD.

Video encoder 200 may encode an indication of whether the current block is predicted using DIMD. For instance, entropy encoding unit 220 may encode, for the current block, a DIMD flag having a value that indicates whether DIMD is enabled for the current block of video data. As one example, responsive to determining not to predict the current block using DIMD ("No" branch of 1706), video encoder 200 may encode the DIMD flag with a false (e.g., 0) value to indicate that the current block is not predicted using DIMD (1708). As another example, responsive to determining to predict the current block using DIMD ("Yes" branch of 1706), video encoder 200 may encode the DIMD flag with a true (e.g., 1) value to indicate that the current block is predicted using DIMD (1714).

Video encoder 200 may encode one or more syntax elements indicating a selected intra mode from the MPM list (1710). For instance, entropy encoding unit 220 may encode a syntax element having a value that indicates an index in the MPM list of the selected intra mode.

In some examples, as discussed above, video encoder 200 may include a reconstruction loop in which blocks of video data a reconstructed to be used as reference when predicting subsequent blocks. As one example, where the current block is not predicted using DIMD, video encoder 200 may predict the current block using the selected intra mode (1712). For instance, intra-prediction unit 226 may generate a prediction block using samples in the direction specified by the selected intra mode. As another example, where the current block is predicted using DIMD, video encoder 200 may predict the current block using DIMD (1716). For instance, intra-prediction unit 226 may predict the current block using the technique described above with reference to FIG. 8.

Figure 18:
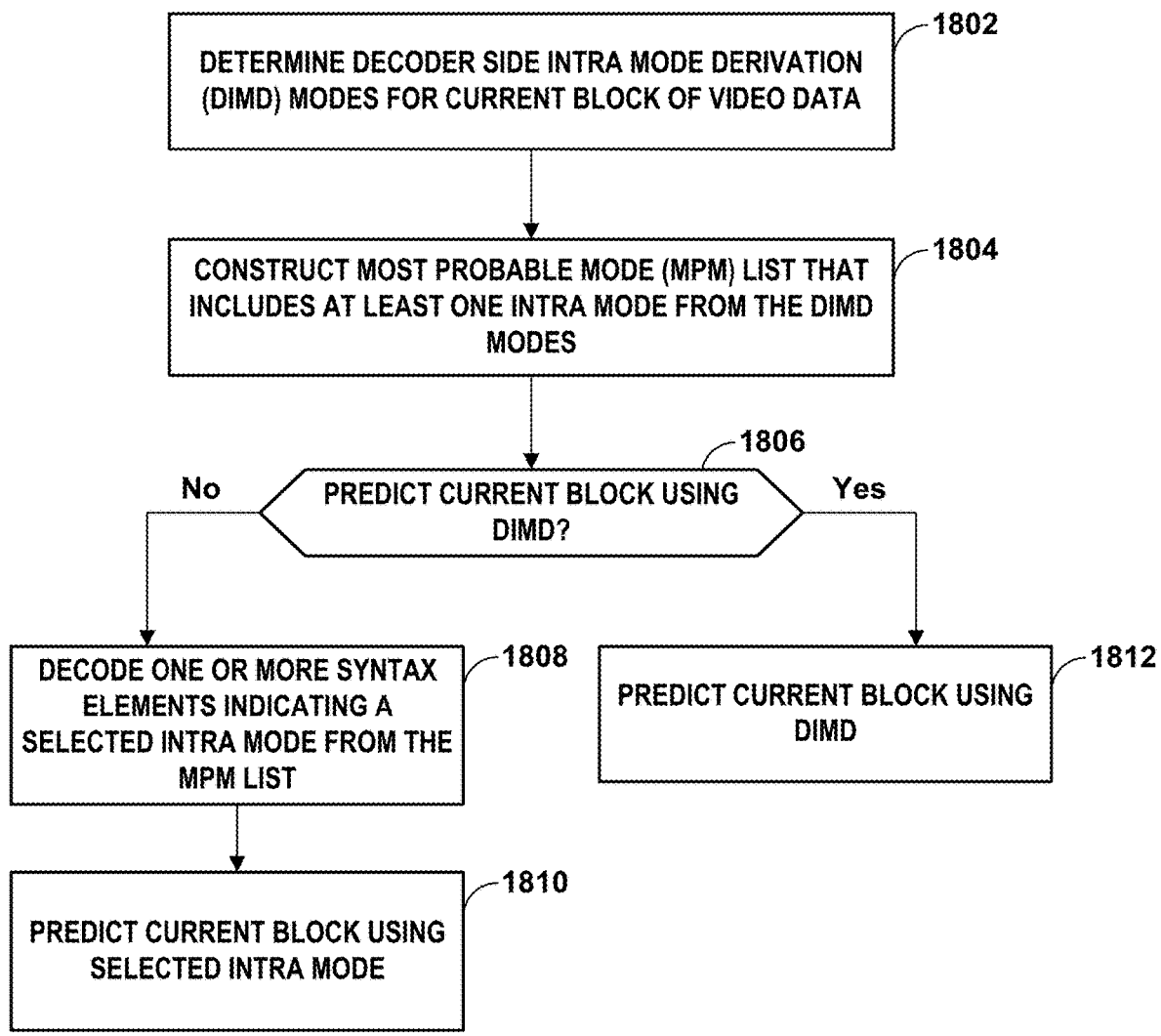
FIG. 18 is a flowchart illustrating an example technique for decoding video data using DIMD, in accordance with one or more techniques of this disclosure.

FIG. 18 is a flowchart illustrating an example technique for decoding video data using DIMD, in accordance with one or more techniques of this disclosure. Although described with respect to video decoder 300 (FIGS. 1 and 4), it should be understood that other devices may be configured to perform a method similar to that of FIG. 18.

Video decoder 300 may derive, for a current block of video data, a list of decoder side intra mode derivation (DIMD) intra modes using reconstructed samples of neighboring blocks (1802). For instance, intra-prediction unit 318 may derive the DIMD intra modes using the technique discussed above with reference to FIG. 7 to obtain a first DIMD intra mode M1 and a second DIMD intra mode M2.

Video decoder 300 may construct, for the current block, a most probable mode (MPM) list that includes at least one intra mode from the DIMD modes (1804). For instance, intra-prediction unit 318 may construct the MPM list using the technique discussed above with reference to FIG. 11. The constructed MPM list may include one or both of the first DIMD intra mode M1 and the second DIMD intra mode M2.

Video decoder 300 may determine whether to predict the current block using DIMD (1806). For instance, entropy decoding unit 302 may decode, for the current block, a DIMD flag having a value that indicates whether DIMD is enabled for the current block of video data. Based on the value of the DIMD flag, intra-prediction unit 318 may determine whether to predict the current block using DIMD. As one example, where the value of the flag is true (e.g., 1), intra-prediction unit 318 may determine to predict the current block using DIMD. As another example, where the value of the flag is false (e.g., 0), intra-prediction unit 318 may determine not to predict the current block using DIMD. As noted above, in some examples, video decoder 300 may derive the list of DIMD intra modes regardless of the value of the DIMD flag.

Where video decoder 300 determines to not predict the current block using DIMD ("No" branch of 1806), entropy decoding unit 302 may decode one or more syntax elements indicating a selected intra mode from the MPM list (1808) (e.g., indicating an index in the MPM list). For example, entropy decoding unit 302 may decode a intra_luma_mpm_idx syntax element that specifies the index in the MPM list of the selected intra mode.

Video decoder 300 may predict, using the candidate selected from the constructed MPM list, the current block (1810). For instance, intra-prediction unit 318 may generate a prediction block for the current block using the selected intra mode from the MPM list. Reconstruction unit 310 may combine the prediction block with a residual block (e.g., similar to 380 of FIG. 16).

Where video decoder 300 determines to predict the current block using DIMD ("Yes" branch of 1806), entropy decoding unit 302 may predict the current block using DIMD (1812). For instance, intra-prediction unit 318 may predict the current block using the technique described above with reference to FIG. 8.

The following numbered clauses may illustrate one or more examples of this disclosure:

Clause 1A. A method of decoding video data, the method comprising: deriving, for a current block of video data and using decoder side intra mode derivation (DIMD), a list of intra modes using reconstructed samples of neighboring blocks; constructing, for the current block, a most possible mode (MPM) list that includes at least one intra mode from the derived list of intra modes; and predicting, using a candidate selected from the constructed MPM list, the current block.

Clause 2A. The method of clause 1A, wherein deriving the list of intra modes using DIMD comprises deriving the list of intra modes using DIMD regardless of a value of a DIMD flag.

Clause 3A. The method of clause 1A or clause 2A, wherein constructing the MPM list comprises: inserting, into the MPM list, a first candidate from the list of intra modes derived using DIMD; and selectively inserting, based on a sum of intensity of a second candidate from the list of intra modes derived using DIMD, the second candidate into the MPM list.

Clause 4A. The method of clause 3A, wherein constructing the MPM list further comprises: inserting, into the MPM list and after the first candidate, additional intra mode candidates.

Clause 5A. A device for coding video data, the device comprising one or more means for performing the method of any of clauses 1A-4A.

Clause 6A. The device of clause 5A, wherein the one or more means comprise one or more processors implemented in circuitry.

Clause 7A. The device of any of clauses 5A and 6A, further comprising a memory to store the video data.

Clause 8A. The device of any of clauses 5A-7A, further comprising a display configured to display decoded video data.

Clause 9A. The device of any of clauses 5A-8A, wherein the device comprises one or more of a camera, a computer, a mobile device, a broadcast receiver device, or a set-top box.

Clause 10A. A computer-readable storage medium having stored thereon instructions that, when executed, cause one or more processors to perform the method of any of clauses 1A-4A.

Clause 1B. A method of decoding video data, the method comprising: deriving, for a current block of video data and using decoder side intra mode derivation (DIMD), a list of intra modes using reconstructed samples of neighboring blocks; constructing, for the current block, a most probable mode (MPM) list, wherein constructing the MPM list comprises inserting, into the MPM list, at least one intra mode from the derived list of intra modes; and predicting, using a candidate selected from the constructed MPM list, the current block.

Clause 2B. The method of clause 1B, further comprising: decoding, for the current block, a DIMD flag having a value that indicates whether DIMD is enabled for the current block of video data, wherein deriving the list of intra modes using DIMD comprises deriving the list of intra modes using DIMD regardless of a value of the DIMD flag.

Clause 3B. The method of clause 1B, wherein inserting the at least one intra mode from the derived list of intra modes into the MPM list comprises: inserting, into the MPM list, a first candidate from the list of intra modes derived using DIMD; and selectively inserting, in to the MPM list, a second candidate from the list of intra modes derived using DIMD.

Clause 4B. The method of clause 3B, wherein selectively inserting the second candidate comprises selectively inserting, based on a sum of intensity of the second candidate from the list of intra modes derived using DIMD, the second candidate into the MPM list.

Clause 5B. The method of clause 1B, wherein constructing the MPM list further comprises: inserting, into the MPM list and after the at least one intra mode from the derived list of intra modes, additional intra mode candidates.

Clause 6B. The method of clause 5B, wherein inserting the additional intra mode candidates comprises: inserting, into the MPM list and after the at least one intra mode from the derived list of intra modes, one or more default candidates.

Clause 7B. The method of clause 5B, wherein constructing the MPM list further comprises: inserting, into the MPM list and before the at least one intra mode from the derived list of intra modes, one or more intra mode candidates that are prediction modes from neighboring blocks of the current block.

Clause 8B. A method of encoding video data, the method comprising: deriving, for a current block of video data and using decoder side intra mode derivation (DIMD), a list of intra modes using reconstructed samples of neighboring blocks; constructing, for the current block, a most probable mode (MPM) list, wherein constructing the MPM list comprises inserting, into the MPM list, at least one intra mode from the derived list of intra modes; selecting, for the current block and from the MPM list, a candidate intra mode; and encoding, for the current block, one or more syntax element that specify the candidate intra mode.

Clause 9B. The method of clause 8B, further comprising: encoding, for the current block, a DIMD flag having a value that indicates whether DIMD is enabled for the current block of video data, wherein deriving the list of intra modes using DIMD comprises deriving the list of intra modes using DIMD regardless of a value of the DIMD flag.

Clause 10B. The method of clause 8B, wherein inserting the at least one intra mode from the derived list of intra modes into the MPM list comprises: inserting, into the MPM list, a first candidate from the list of intra modes derived using DIMD; and selectively inserting, in to the MPM list, a second candidate from the list of intra modes derived using DIMD.

Clause 11B. The method of clause 10B, wherein selectively inserting the second candidate comprises selectively inserting, based on a sum of intensity of the second candidate from the list of intra modes derived using DIMD, the second candidate into the MPM list.

Clause 12B. The method of clause 8B, wherein constructing the MPM list further comprises: inserting, into the MPM list and after the at least one intra mode from the derived list of intra modes, additional intra mode candidates.

Clause 13B. The method of clause 12B, wherein inserting the additional intra mode candidates comprises: inserting, into the MPM list and after the at least one intra mode from the derived list of intra modes, one or more default candidates.

Clause 14B. The method of clause 12B, wherein constructing the MPM list further comprises: inserting, into the MPM list and before the at least one intra mode from the derived list of intra modes, one or more intra mode candidates that are prediction modes from neighboring blocks of the current block.

Clause 15B. A device for decoding video data, the device comprising: a memory configured to store video data; and one or more processors implemented in circuitry and configured to: derive, for a current block of video data and using decoder side intra mode derivation (DIMD), a list of intra modes using reconstructed samples of neighboring blocks; construct, for the current block, a most probable mode (MPM) list, wherein constructing the MPM list comprises inserting, into the MPM list, at least one intra mode from the derived list of intra modes; and predict, using a candidate selected from the constructed MPM list, the current block.

Clause 16B. The device of clause 15B, wherein the one or more processors are further configured to: decode, for the current block, a DIMD flag having a value that indicates whether DIMD is enabled for the current block of video data, wherein, to derive the list of intra modes using DIMD, the one or more processors are configured to derive the list of intra modes using DIMD regardless of a value of the DIMD flag.

Clause 17B. The device of clause 15B, wherein, to insert the at least one intra mode from the derived list of intra modes into the MPM list, the one or more processors are configured to: insert, into the MPM list, a first candidate from the list of intra modes derived using DIMD; and selectively insert, in to the MPM list, a second candidate from the list of intra modes derived using DIMD.

Clause 18B. The device of clause 17B, wherein, to selectively insert the second candidate, the one or more processors are configured to selectively insert, based on a sum of intensity of the second candidate from the list of intra modes derived using DIMD, the second candidate into the MPM list.

Clause 19B. The device of clause 15B, wherein, to construct the MPM list, the one or more processors are configured to: insert, into the MPM list and after the at least one intra mode from the derived list of intra modes, additional intra mode candidates.

Clause 20B. The device of clause 19B, wherein, to insert the additional intra mode candidates, the one or more processors are configured to: insert, into the MPM list and after the at least one intra mode from the derived list of intra modes, one or more default candidates.

Clause 21B. The device of clause 19B, wherein, to construct the MPM list, the one or more processors are configured to: insert, into the MPM list and before the at least one intra mode from the derived list of intra modes, one or more intra mode candidates that are prediction modes from neighboring blocks of the current block.

Clause 22B. A device for encoding video data, the device comprising: a memory configured to store video data; and one or more processors implemented in circuitry and configured to: derive, for a current block of video data and using decoder side intra mode derivation (DIMD), a list of intra modes using reconstructed samples of neighboring blocks; construct, for the current block, a most probable mode (MPM) list, wherein constructing the MPM list comprises inserting, into the MPM list, at least one intra mode from the derived list of intra modes; select, for the current block and from the MPM list, a candidate intra mode; and encode, for the current block, one or more syntax element that specify the candidate intra mode.

Clause 23B. The device of clause 22B, wherein the one or more processors are further configured to: encode, for the current block, a DIMD flag having a value that indicates whether DIMD is enabled for the current block of video data, wherein, to derive the list of intra modes using DIMD, the one or more processors are configured to derive the list of intra modes using DIMD regardless of a value of the DIMD flag.

Clause 24B. The device of clause 22B, wherein, to insert the at least one intra mode from the derived list of intra modes into the MPM list, the one or more processors are configured to: insert, into the MPM list, a first candidate from the list of intra modes derived using DIMD; and selectively insert, in to the MPM list, a second candidate from the list of intra modes derived using DIMD.

Clause 25B. The device of clause 24B, wherein, to selectively insert the second candidate, the one or more processors are configured to selectively insert, based on a sum of intensity of the second candidate from the list of intra modes derived using DIMD, the second candidate into the MPM list.

Clause 26B. The device of clause 22B, wherein, to construct the MPM list, the one or more processors are configured to: insert, into the MPM list and after the at least one intra mode from the derived list of intra modes, additional intra mode candidates.

Clause 27B. The device of clause 26B, wherein, to insert the additional intra mode candidates, the one or more processors are configured to: insert, into the MPM list and after the at least one intra mode from the derived list of intra modes, one or more default candidates.

Clause 28B. The device of clause 26B, wherein, to construct the MPM list, the one or more processors are configured to: insert, into the MPM list and before the at least one intra mode from the derived list of intra modes, one or more intra mode candidates that are prediction modes from neighboring blocks of the current block.

Clause 1C. A method of decoding video data, the method comprising: deriving, for a current block of video data and using decoder side intra mode derivation (DIMD), a list of intra modes using reconstructed samples of neighboring blocks; constructing, for the current block, a most probable mode (MPM) list, wherein constructing the MPM list comprises inserting, into the MPM list, at least one intra mode from the derived list of intra modes; and predicting, using a candidate selected from the constructed MPM list, the current block.

Clause 2C. The method of clause 1C, further comprising: decoding, for the current block, a DIMD flag having a value that indicates whether DIMD is enabled for the current block of video data, wherein deriving the list of intra modes using DIMD comprises deriving the list of intra modes using DIMD regardless of a value of the DIMD flag.

Clause 3C. The method of clause 1C or 2C, wherein inserting the at least one intra mode from the derived list of intra modes into the MPM list comprises: inserting, into the MPM list, a first candidate from the list of intra modes derived using DIMD; and selectively inserting, in to the MPM list, a second candidate from the list of intra modes derived using DIMD.

Clause 4C. The method of clause 3C, wherein selectively inserting the second candidate comprises selectively inserting, based on a sum of intensity of the second candidate from the list of intra modes derived using DIMD, the second candidate into the MPM list.

Clause 5C. The method of any of clauses 1C-4C, wherein constructing the MPM list further comprises: inserting, into the MPM list and after the at least one intra mode from the derived list of intra modes, additional intra mode candidates.

Clause 6C. The method of clause 5C, wherein inserting the additional intra mode candidates comprises: inserting, into the MPM list and after the at least one intra mode from the derived list of intra modes, one or more default candidates.

Clause 7C. The method of clause 5C or 6C, wherein constructing the MPM list further comprises: inserting, into the MPM list and before the at least one intra mode from the derived list of intra modes, one or more intra mode candidates that are prediction modes from neighboring blocks of the current block.

Clause 8C. A method of encoding video data, the method comprising: deriving, for a current block of video data and using decoder side intra mode derivation (DIMD), a list of intra modes using reconstructed samples of neighboring blocks; constructing, for the current block, a most probable mode (MPM) list, wherein constructing the MPM list comprises inserting, into the MPM list, at least one intra mode from the derived list of intra modes; selecting, for the current block and from the MPM list, a candidate intra mode; and encoding, for the current block, one or more syntax element that specify the candidate intra mode.

Clause 9C. The method of clause 8C, further comprising: encoding, for the current block, a DIMD flag having a value that indicates whether DIMD is enabled for the current block of video data, wherein deriving the list of intra modes using DIMD comprises deriving the list of intra modes using DIMD regardless of a value of the DIMD flag.

Clause 10C. The method of clause 8C or 9C, wherein inserting the at least one intra mode from the derived list of intra modes into the MPM list comprises: inserting, into the MPM list, a first candidate from the list of intra modes derived using DIMD; and selectively inserting, in to the MPM list, a second candidate from the list of intra modes derived using DIMD.

Clause 11C. The method of clause 10C, wherein selectively inserting the second candidate comprises selectively inserting, based on a sum of intensity of the second candidate from the list of intra modes derived using DIMD, the second candidate into the MPM list.

Clause 12C. The method of any of clauses 8C-11C, wherein constructing the MPM list further comprises: inserting, into the MPM list and after the at least one intra mode from the derived list of intra modes, additional intra mode candidates.

Clause 13C. The method of clause 12C, wherein inserting the additional intra mode candidates comprises: inserting, into the MPM list and after the at least one intra mode from the derived list of intra modes, one or more default candidates.

Clause 14C. The method of clause 12C or 13C, wherein constructing the MPM list further comprises: inserting, into the MPM list and before the at least one intra mode from the derived list of intra modes, one or more intra mode candidates that are prediction modes from neighboring blocks of the current block.

Clause 15C. A device for decoding video data, the device comprising: a memory configured to store video data; and one or more processors implemented in circuitry and configured to: derive, for a current block of video data and using decoder side intra mode derivation (DIMD), a list of intra modes using reconstructed samples of neighboring blocks; construct, for the current block, a most probable mode (MPM) list, wherein constructing the MPM list comprises inserting, into the MPM list, at least one intra mode from the derived list of intra modes; and predict, using a candidate selected from the constructed MPM list, the current block.

Clause 16C. The device of clause 15C, wherein the one or more processors are further configured to: decode, for the current block, a DIMD flag having a value that indicates whether DIMD is enabled for the current block of video data, wherein, to derive the list of intra modes using DIMD, the one or more processors are configured to derive the list of intra modes using DIMD regardless of a value of the DIMD flag.

Clause 17C. The device of clause 15C or 16C, wherein, to insert the at least one intra mode from the derived list of intra modes into the MPM list, the one or more processors are configured to: insert, into the MPM list, a first candidate from the list of intra modes derived using DIMD; and selectively insert, in to the MPM list, a second candidate from the list of intra modes derived using DIMD.

Clause 18C. The device of clause 17C, wherein, to selectively insert the second candidate, the one or more processors are configured to selectively insert, based on a sum of intensity of the second candidate from the list of intra modes derived using DIMD, the second candidate into the MPM list.

Clause 19C. The device of any of clauses 15C-18C, wherein, to construct the MPM list, the one or more processors are configured to: insert, into the MPM list and after the at least one intra mode from the derived list of intra modes, additional intra mode candidates.

Clause 20C. The device of clause 19C, wherein, to insert the additional intra mode candidates, the one or more processors are configured to: insert, into the MPM list and after the at least one intra mode from the derived list of intra modes, one or more default candidates.

Clause 21C. The device of clause 19C or 20C, wherein, to construct the MPM list, the one or more processors are configured to: insert, into the MPM list and before the at least one intra mode from the derived list of intra modes, one or more intra mode candidates that are prediction modes from neighboring blocks of the current block.

Clause 22C. A device for encoding video data, the device comprising: a memory configured to store video data; and one or more processors implemented in circuitry and configured to: derive, for a current block of video data and using decoder side intra mode derivation (DIMD), a list of intra modes using reconstructed samples of neighboring blocks; construct, for the current block, a most probable mode (MPM) list, wherein constructing the MPM list comprises inserting, into the MPM list, at least one intra mode from the derived list of intra modes; select, for the current block and from the MPM list, a candidate intra mode; and encode, for the current block, one or more syntax element that specify the candidate intra mode.

Clause 23C. The device of clause 22C, wherein the one or more processors are further configured to: encode, for the current block, a DIMD flag having a value that indicates whether DIMD is enabled for the current block of video data, wherein, to derive the list of intra modes using DIMD, the one or more processors are configured to derive the list of intra modes using DIMD regardless of a value of the DIMD flag.

Clause 24C. The device of clause 22C or 23C, wherein, to insert the at least one intra mode from the derived list of intra modes into the MPM list, the one or more processors are configured to: insert, into the MPM list, a first candidate from the list of intra modes derived using DIMD; and selectively insert, in to the MPM list, a second candidate from the list of intra modes derived using DIMD.

Clause 25C. The device of clause 24C, wherein, to selectively insert the second candidate, the one or more processors are configured to selectively insert, based on a sum of intensity of the second candidate from the list of intra modes derived using DIMD, the second candidate into the MPM list.

Clause 26C. The device of any of clauses 22C-25C, wherein, to construct the MPM list, the one or more processors are configured to: insert, into the MPM list and after the at least one intra mode from the derived list of intra modes, additional intra mode candidates.

Clause 27C. The device of clause 26C, wherein, to insert the additional intra mode candidates, the one or more processors are configured to: insert, into the MPM list and after the at least one intra mode from the derived list of intra modes, one or more default candidates.

Clause 28C. The device of clause 26C or 27C, wherein, to construct the MPM list, the one or more processors are configured to: insert, into the MPM list and before the at least one intra mode from the derived list of intra modes, one or more intra mode candidates that are prediction modes from neighboring blocks of the current block.

Clause 1D. A computer-readable storage medium storing instructions that, when executed, cause one or more processors of a video coder to perform the method of any of clauses 1C-7C.

Clause 1E. A computer-readable storage medium storing instructions that, when executed, cause one or more processors of a video coder to perform the method of any of clauses 8C-14C.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   deriving, for a current block of video data and using decoder side intra mode derivation (DIMD), a list of intra modes using reconstructed samples of neighboring blocks;
   constructing, for the current block, a most probable mode (MPM) list, wherein constructing the MPM list comprises:
      inserting, into the MPM list, at least one intra mode from the derived list of intra modes, wherein inserting the at least one intra mode from the derived list of intra modes into the MPM list comprises:
         inserting, into the MPM list, a first candidate from the list of intra modes derived using DIMD; and
         selectively inserting, in to the MPM list, a second candidate from the list of intra modes derived using DIMD; and
      inserting, into the MPM list and after the at least one intra mode from the derived list of intra modes, additional intra mode candidates; and
   intra predicting, using a candidate selected from the constructed MPM list, the current block.

2. The method of claim 1, further comprising:
   decoding, for the current block, a DIMD flag having a value that indicates whether DIMD is enabled for the current block of video data, wherein deriving the list of intra modes using DIMD comprises deriving the list of intra modes using DIMD regardless of a value of the DIMD flag.

3. The method of claim 1, wherein selectively inserting the second candidate comprises selectively inserting, based on a sum of intensity of the second candidate from the list of intra modes derived using DIMD, the second candidate into the MPM list.

4. The method of claim 1, wherein inserting the additional intra mode candidates comprises:
inserting, into the MPM list and after the at least one intra mode from the derived list of intra modes, one or more default candidates.

5. The method of claim 1, wherein constructing the MPM list further comprises:
inserting, into the MPM list and before the at least one intra mode from the derived list of intra modes, one or more intra mode candidates that are prediction modes from neighboring blocks of the current block.

6. A method of encoding video data, the method comprising:
deriving, for a current block of video data and using decoder side intra mode derivation (DIMD), a list of intra modes using reconstructed samples of neighboring blocks;
constructing, for the current block, a most probable mode (MPM) list, wherein constructing the MPM list comprises:
inserting, into the MPM list, at least one intra mode from the derived list of intra modes, wherein inserting the at least one intra mode from the derived list of intra modes into the MPM list comprises:
inserting, into the MPM list, a first candidate from the list of intra modes derived using DIMD; and
selectively inserting, in to the MPM list, a second candidate from the list of intra modes derived using DIMD; and
inserting, into the MPM list and after the at least one intra mode from the derived list of intra modes, additional intra mode candidates;
selecting, for the current block and from the MPM list, a candidate intra mode;
intra predicting, using the candidate selected from the constructed MPM list, the current block; and
encoding, for the current block, one or more syntax element that specify the candidate intra mode.

7. The method of claim 6, further comprising:
encoding, for the current block, a DIMD flag having a value that indicates whether DIMD is enabled for the current block of video data, wherein deriving the list of intra modes using DIMD comprises deriving the list of intra modes using DIMD regardless of a value of the DIMD flag.

8. The method of claim 6, wherein selectively inserting the second candidate comprises selectively inserting, based on a sum of intensity of the second candidate from the list of intra modes derived using DIMD, the second candidate into the MPM list.

9. The method of claim 6, wherein inserting the additional intra mode candidates comprises:
inserting, into the MPM list and after the at least one intra mode from the derived list of intra modes, one or more default candidates.

10. The method of claim 6, wherein constructing the MPM list further comprises:
inserting, into the MPM list and before the at least one intra mode from the derived list of intra modes, one or more intra mode candidates that are prediction modes from neighboring blocks of the current block.

11. A device for decoding video data, the device comprising:
a memory configured to store video data; and
one or more processors implemented in circuitry and configured to:
derive, for a current block of video data and using decoder side intra mode derivation (DIMD), a list of intra modes using reconstructed samples of neighboring blocks;
construct, for the current block, a most probable mode (MPM) list, wherein, to construct the MPM list, the one or more processors are configured to:
insert, into the MPM list, at least one intra mode from the derived list of intra modes, wherein, to insert the at least one intra mode from the derived list of intra modes into the MPM list, the one or more processors are configured to:
insert, into the MPM list, a first candidate from the list of intra modes derived using DIMD; and
selectively insert, in to the MPM list, a second candidate from the list of intra modes derived using DIMD; and
insert, into the MPM list and after the at least one intra mode from the derived list of intra modes, additional intra mode candidates; and
intra predict, using a candidate selected from the constructed MPM list, the current block.

12. The device of claim 11, wherein the one or more processors are further configured to:
decode, for the current block, a DIMD flag having a value that indicates whether DIMD is enabled for the current block of video data, wherein, to derive the list of intra modes using DIMD, the one or more processors are configured to derive the list of intra modes using DIMD regardless of a value of the DIMD flag.

13. The device of claim 11, wherein, to selectively insert the second candidate, the one or more processors are configured to selectively insert, based on a sum of intensity of the second candidate from the list of intra modes derived using DIMD, the second candidate into the MPM list.

14. The device of claim 11, wherein, to insert the additional intra mode candidates, the one or more processors are configured to:
insert, into the MPM list and after the at least one intra mode from the derived list of intra modes, one or more default candidates.

15. The device of claim 11, wherein, to construct the MPM list, the one or more processors are configured to:
insert, into the MPM list and before the at least one intra mode from the derived list of intra modes, one or more intra mode candidates that are prediction modes from neighboring blocks of the current block.

16. A device for encoding video data, the device comprising:
a memory configured to store video data; and
one or more processors implemented in circuitry and configured to:
derive, for a current block of video data and using decoder side intra mode derivation (DIMD), a list of intra modes using reconstructed samples of neighboring blocks;

construct, for the current block, a most probable mode (MPM) list, wherein, to construct the MPM list, the one or more processors are configured to:

insert, into the MPM list, at least one intra mode from the derived list of intra modes, wherein, to insert the at least one intra mode from the derived list of intra modes into the MPM list, the one or more processors are configured to:

insert, into the MPM list, a first candidate from the list of intra modes derived using DIMD; and selectively insert, in to the MPM list, a second candidate from the list of intra modes derived using DIMD; and insert, into the MPM list and after the at least one intra mode from the derived list of intra modes, additional intra mode candidates;

select, for the current block and from the MPM list, a candidate intra mode;

intra predicting, using the candidate selected from the constructed MPM list, the current block; and encode, for the current block, one or more syntax element that specify the candidate intra mode.

17. The device of claim 16, wherein the one or more processors are further configured to:

encode, for the current block, a DIMD flag having a value that indicates whether DIMD is enabled for the current block of video data, wherein, to derive the list of intra modes using DIMD, the one or more processors are configured to derive the list of intra modes using DIMD regardless of a value of the DIMD flag.

18. The device of claim 16, wherein, to selectively insert the second candidate, the one or more processors are configured to selectively insert, based on a sum of intensity of the second candidate from the list of intra modes derived using DIMD, the second candidate into the MPM list.

19. The device of claim 16, wherein, to insert the additional intra mode candidates, the one or more processors are configured to:

insert, into the MPM list and after the at least one intra mode from the derived list of intra modes, one or more default candidates.

20. The device of claim 16, wherein, to construct the MPM list, the one or more processors are configured to:

insert, into the MPM list and before the at least one intra mode from the derived list of intra modes, one or more intra mode candidates that are prediction modes from neighboring blocks of the current block.

\* \* \* \* \*